United States Patent
Matsubara et al.

(10) Patent No.: US 11,541,869 B2
(45) Date of Patent: Jan. 3, 2023

(54) CONTROLLER AND CONTROL METHOD FOR HYBRID VEHICLE

(71) Applicant: TOYOTA JIDOSHA KABUSHIKI KAISHA, Toyota (JP)

(72) Inventors: Tooru Matsubara, Toyota (JP); Atsushi Tabata, Okazaki (JP); Koichi Okuda, Toyota (JP); Yasutaka Tsuchida, Toyota (JP); Kenta Kumazaki, Anjyo (JP); Tatsuya Imamura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 16/942,992

(22) Filed: Jul. 30, 2020

(65) Prior Publication Data

US 2021/0039626 A1    Feb. 11, 2021

(30) Foreign Application Priority Data

Aug. 9, 2019 (JP) .............................. JP2019-147947

(51) Int. Cl.
*B60W 20/13* (2016.01)
*B60W 20/15* (2016.01)
(Continued)

(52) U.S. Cl.
CPC ............ *B60W 20/13* (2016.01); *B60W 10/04* (2013.01); *B60W 20/15* (2016.01); *B60W 20/40* (2013.01);
(Continued)

(58) Field of Classification Search
CPC ...... B60W 20/13; B60W 10/04; B60W 20/15; B60W 20/40; B60W 2710/0666;
(Continued)

(56) References Cited

U.S. PATENT DOCUMENTS 4,459,809 A * 7/1984 Tadokoro ................ F02B 37/18
60/602
4,565,178 A * 1/1986 Nagase ................... F02B 29/00
123/564

(Continued)

FOREIGN PATENT DOCUMENTS

CA       2771315 A1 * 2/2011 ............... B60L 7/14
JP       63-227955 A    9/1988
WO   WO-2015181614 A1 * 12/2015 ............... B60K 6/48

*Primary Examiner* — B M M Hannan
(74) *Attorney, Agent, or Firm* — Oblon, McClelland, Maier & Neustadt, L.L.P.

(57) ABSTRACT

There are provided a controller and a control method for a hybrid vehicle including an engine with a supercharger serving as a drive power source for travel, a rotary machine serving as a drive power source for travel, and a power storage device configured to transmit and receive electric power to and from the rotary machine. The controller determines whether an operation of the supercharger is limited, compensates for a torque shortage of the engine due to limitation of the operation of the supercharger by a torque of the rotary machine when it is determined that the operation of the supercharger is limited, and curbs a decrease in an amount of electric power stored in the power storage device more when it is determined that the operation of the supercharger is limited than when it is determined that the operation of the supercharger is not limited.

8 Claims, 11 Drawing Sheets

(51) Int. Cl.
 *B60W 20/40* (2016.01)
 *B60W 10/04* (2006.01)
(52) U.S. Cl.
 CPC ............... *B60W 2710/0666* (2013.01); *B60W 2710/083* (2013.01); *B60W 2710/086* (2013.01)
(58) Field of Classification Search
 CPC ..... B60W 2710/083; B60W 2710/086; B60W 2552/40; B60W 10/06; B60W 10/08; B60W 10/10; B60W 10/26; B60W 2510/0633; B60W 2710/242; B60W 10/101; B60W 10/11; B60W 20/00; B60W 2510/083; B60W 2510/244; Y02T 10/62; Y02T 10/70; Y02T 10/7072; Y02T 10/72; Y02T 90/14; B60K 6/445; B60K 6/543; B60K 6/547
 USPC .......................................................... 701/22
 See application file for complete search history.

(56) References Cited

U.S. PATENT DOCUMENTS

| | | | | |
|---|---|---|---|---|
| 5,186,081 A | * | 2/1993 | Richardson | F02D 41/0007 701/99 |
| 5,423,392 A | * | 6/1995 | Kobayashi | B60K 28/16 180/197 |
| 5,789,881 A | * | 8/1998 | Egami | B60W 20/00 180/65.245 |
| 2006/0270519 A1 | * | 11/2006 | Kamada | F02M 26/55 477/3 |
| 2008/0058152 A1 | * | 3/2008 | Ortmann | B60W 10/06 477/3 |
| 2013/0174806 A1 | * | 7/2013 | Nagakura | F02B 17/005 123/296 |
| 2018/0170345 A1 | * | 6/2018 | Katsumata | B60K 6/365 |
| 2019/0077392 A1 | * | 3/2019 | Fujita | F28F 27/00 |

\* cited by examiner

| AT GEAR STAGE | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

| MOCK GEAR STAGE | | 1 | 2 | 3 | 4 | 5 | 6 | 7 | 8 | 9 | 10 |
|---|---|---|---|---|---|---|---|---|---|---|---|
| AT GEAR STAGE | UP SHIFT | 1 | 1 | 1 | 2 | 2 | 2 | 3 | 3 | 3 | 4 |
| | DOWN SHIFT | 1 | 1 | 2 | 2 | 2 | 3 | 3 | 3 | 4 | 4 |

CONTROLLER AND CONTROL METHOD FOR HYBRID VEHICLE

CROSS-REFERENCE TO RELATED APPLICATION

This application claims priority to Japanese Patent Application No. 2019-147947 filed on Aug. 9, 2019, incorporated herein by reference in its entirety.

BACKGROUND

1. Technical Field

The disclosure relates to a controller and a control method for a hybrid vehicle including an engine with a supercharger and a rotary machine as drive power sources for travel.

2. Description of Related Art

A hybrid vehicle that includes an engine with a supercharger, a rotary machine, and a power storage device which transmits and receives electric power to and from the rotary machine and uses the engine and the rotary machine as drive power sources is known. As described in Japanese Unexamined Patent Application Publication No. 63-227955 (JP 63-227955 A), in an engine with a supercharger, knocking is likely to occur as a supercharging pressure increases. On the other hand, as described in JP 63-227955 A, when knocking occurs, the operation of the supercharger is limited to decrease the supercharging pressure from the supercharger.

SUMMARY

When the operation of the supercharger is limited, an engine torque is limited and thus a decrease in drive power with respect to a required drive power for the vehicle is caused. Therefore, compensating for a torque shortage of the engine due to limitation of the operation of the supercharger by torque assist using the rotary machine can be considered, but there is a likelihood that an amount of electric power stored in a power storage device will decrease and torque assist will not be able to be performed when the number of times torque assist is performed increases.

The disclosure provides a controller and a control method that can prevent torque assist by a rotary machine from not being performed due to a decrease in an amount of electric power stored in a power storage device in a hybrid vehicle which uses an engine with a supercharger and a rotary machine as drive power sources for travel and in which a torque shortage in the engine due to limitation of operation of the supercharger is compensated for by torque assist using the rotary machine.

According to a first aspect of the disclosure, there is provided a controller for a hybrid vehicle, the hybrid vehicle including an engine with a supercharger serving as a drive power source for travel, a rotary machine serving as a drive power source for travel, and a power storage device configured to transmit and receive electric power to and from the rotary machine. The controller includes: a state determining unit configured to determine whether an operation of the supercharger is limited; a torque compensation unit configured to compensate for a torque shortage of the engine due to limitation of the operation of the supercharger by a torque of the rotary machine when it is determined that the operation of the supercharger is limited; and a stored electric power decrease curbing unit configured to curb a decrease in an amount of electric power stored in the power storage device more when it is determined that the operation of the supercharger is limited than when it is determined that the operation of the supercharger is not limited.

With the controller for a hybrid vehicle according to the first aspect of the disclosure, in the configuration in which a torque shortage of the engine due to limitation of the operation of the supercharger is compensated for by a torque of the rotary machine when it is determined that the operation of the supercharger is limited, a decrease in an amount of electric power stored in the power storage device is curbed more when it is determined that the operation of the supercharger is limited than when it is determined that the operation of the supercharger is not limited. Accordingly, it is possible to prevent the torque shortage of the engine from not being compensated for by the torque of the rotary machine due to a decrease in the amount of electric power stored in the power storage device during travel.

In the controller for a hybrid vehicle according to the first aspect, the hybrid vehicle may include an automatic transmission in a power transmission path between the drive power sources for travel and driving wheels, and the stored electric power decrease curbing unit may be configured to shift a gear shifting line of the automatic transmission to a higher-speed side when it is determined that the operation of the supercharger is limited than when it is determined that the operation of the supercharger is not limited.

With the controller for a hybrid vehicle having this configuration, since the gear shifting line of the automatic transmission is shifted to a high-speed side, the number of gear shifts of the automatic transmission becomes fewer when the operation of the supercharger is limited than when the operation of the supercharger is not limited. Accordingly, it is possible to curb power consumption due to gear shifting of the automatic transmission and to curb a decrease in an amount of electric power stored in the power storage device.

In the controller for a hybrid vehicle according to this configuration, the state determining unit may be configured to determine continuity of a state in which the operation of the supercharger is limited. The stored electric power decrease curbing unit may be configured to set an amount of shift of the gear shifting line of the automatic transmission to a higher-speed side to be greater when it is determined that the state in which the operation of the supercharger is limited lasts a long time than when it is determined that the state in which the operation of the supercharger is limited lasts a short time.

With the controller for a hybrid vehicle having this configuration, the amount of shift of the gear shifting line of the automatic transmission to a high-speed side is greater when it is determined that the state in which the operation of the supercharger is limited is long than when it is determined that the state in which the operation of the supercharger is limited is short. Since a torque shortage of the engine is more often compensated for by the torque of the rotary machine when it is determined that the state in which the operation of the supercharger is limited is long, a state of charge of the power storage device is likely to decrease in comparison with a case in which it is determined that the state in which the operation of the supercharger is limited is short. Accordingly, since the amount of shift of the gear shifting line of the automatic transmission is greater and the number of gear shifts of the automatic transmission is less when it is determined that the state in which the operation of the supercharger is limited is long than when it is determined that the state in which the operation of the supercharger is limited is short, it is possible to curb power consumption due to gear shifting of the automatic transmission. In this way, since the power consumption of the power storage device due to gear shifting of the automatic transmission is curbed according to the state in which the operation of the supercharger is limited, it is possible to curb a decrease in the amount of electric power stored in the power storage device.

In the controller for a hybrid vehicle according to the first aspect, the stored electric power decrease curbing unit may be configured to increase a regenerative torque at a time of regeneration of the rotary machine when it is determined that the operation of the supercharger is limited than when it is determined that the operation of the supercharger is not limited.

With the controller for a hybrid vehicle having this configuration, since the regenerative torque at the time of regeneration of the rotary machine is greater when it is determined that the operation of the supercharger is limited than when it is determined that the operation of the supercharger is not limited, the state of charge of the power storage device at the time of regeneration of the rotary machine increases and thus it is possible to curb a decrease in the amount of electric power stored in the power storage device.

In the controller for a hybrid vehicle according to this configuration, the state determining unit may be configured to determine continuity of a state in which the operation of the supercharger is limited. The stored electric power decrease curbing unit may be configured to set an amount of increase of the regenerative torque at the time of regeneration of the rotary machine to be greater when it is determined that the state in which the operation of the supercharger is limited is long than when it is determined that the state in which the operation of the supercharger is limited is short.

With the controller for a hybrid vehicle having this configuration, an amount of increase of the regenerative torque at the time of regeneration of the rotary machine is greater when it is determined that the state in which the operation of the supercharger is limited is long than when it is determined that the state in which the operation of the supercharger is limited is short. The state of charge of the power storage device is more likely to decrease when it is determined that the state in which the operation of the supercharger is limited is long than when it is determined that the state in which the operation of the supercharger is limited is short, but since the state of charge at the time of regeneration of the rotary machine becomes greater when it is determined that the state in which the operation of the supercharger is limited is long than when it is determined that the state in which the operation of the supercharger is limited is short, it is possible to curb a decrease in the amount of electric power stored in the power storage device.

In the controller for a hybrid vehicle according to the first aspect, the stored electric power decrease curbing unit may be configured to limit travel with only the rotary machine as the drive power source for travel when it is determined that the operation of the supercharger is limited than when it is determined that the operation of the supercharger is not limited.

With the controller for a hybrid vehicle having this configuration, since travel with only the rotary machine as the drive power source for travel is limited more when it is determined that the operation of the supercharger is limited than when it is determined that the operation of the supercharger is not limited, it is possible to curb a decrease in the state of charge of the power storage device by limiting travel using only the rotary machine to curb power consumption in the power storage device when it is determined that the operation of the supercharger is limited.

In the controller for a hybrid vehicle according to this configuration, the state determining unit may be configured to determine continuity of a state in which the operation of the supercharger is limited. The stored electric power decrease curbing unit may be configured to set an amount of limitation of travel with only the rotary machine as the drive power source for travel to be greater when it is determined that the state in which the operation of the supercharger is limited is long than when it is determined that the state in which the operation of the supercharger is limited is short.

With the controller for a hybrid vehicle having this configuration, an amount of limitation of travel with only the rotary machine as the drive power source for travel is greater when it is determined that the state in which the operation of the supercharger is limited is long than when it is determined that the state in which the operation of the supercharger is limited is short. The state of charge of the power storage device is more likely to decrease when it is determined that the state in which the operation of the supercharger is limited is long than when it is determined that the state in which the operation of the supercharger is limited is short, but since travel using only the rotary machine as the drive power source for travel is limited more when it is determined that the state in which the operation of the supercharger is limited is long than when it is determined that the state in which the operation of the supercharger is limited is short, it is possible to curb power consumption due to travel using only the rotary machine and to curb a decrease in the state of charge of the power storage device.

According to a second aspect of the disclosure, there is provided a control method for a hybrid vehicle including an engine with a supercharger serving as a drive power source for travel, a rotary machine serving as a drive power source for travel, and a power storage device configured to transmit and receive electric power to and from the rotary machine. The control method includes: determining whether an operation of the supercharger is limited; compensating for a torque shortage of the engine due to limitation of the operation of the supercharger by a torque of the rotary machine when it is determined that the operation of the supercharger is limited; and curbing a decrease in an amount of electric power stored in the power storage device more when it is determined that the operation of the supercharger is limited than when it is determined that the operation of the supercharger is not limited.

According to the second aspect of the disclosure, in the configuration in which a torque shortage of the engine due to limitation of the operation of the supercharger is compensated for by a torque of the rotary machine when it is determined that the operation of the supercharger is limited, a decrease in an amount of electric power stored in the power storage device is curbed more when it is determined that the operation of the supercharger is limited than when it is determined that the operation of the supercharger is not limited. Accordingly, it is possible to prevent the torque shortage of the engine from not being compensated for by the torque of the rotary machine due to a decrease in the amount of electric power stored in the power storage device during travel.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiment(s) of the disclosure will be described in detail with reference to the accompanying drawings. The drawings in the following embodiments are appropriately simplified or modified and dimensional ratios and shapes of various parts and the like are not necessarily accurate.

Figure 1:
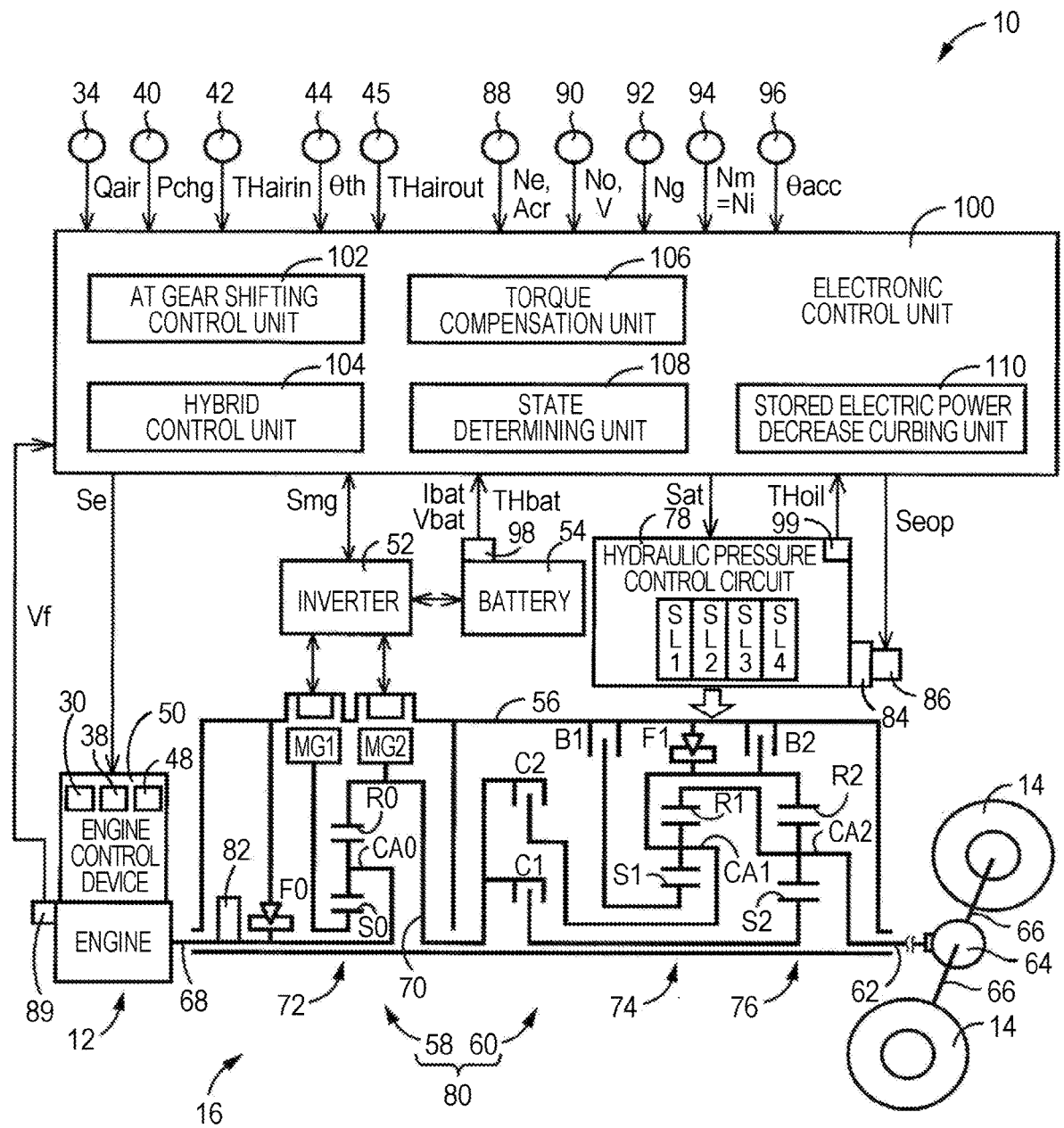
FIG. 1 is a diagram schematically illustrating a configuration of a vehicle to which a first embodiment of the disclosure is applied and illustrating principal parts of a control function and a control system for various types of control in the vehicle.

FIG. 1 is a diagram schematically illustrating a configuration of a vehicle 10 to which a first embodiment of the disclosure is applied and illustrating principal parts of a control system for various types of control in the vehicle 10. In FIG. 1, the vehicle 10 is a hybrid vehicle including an engine 12, a first rotary machine MG1, and a second rotary machine MG2. The vehicle 10 also includes driving wheels 14 and a power transmission device 16 that is provided in a power transmission path between the engine 12 and the driving wheels 14.

Figures 2, 3:
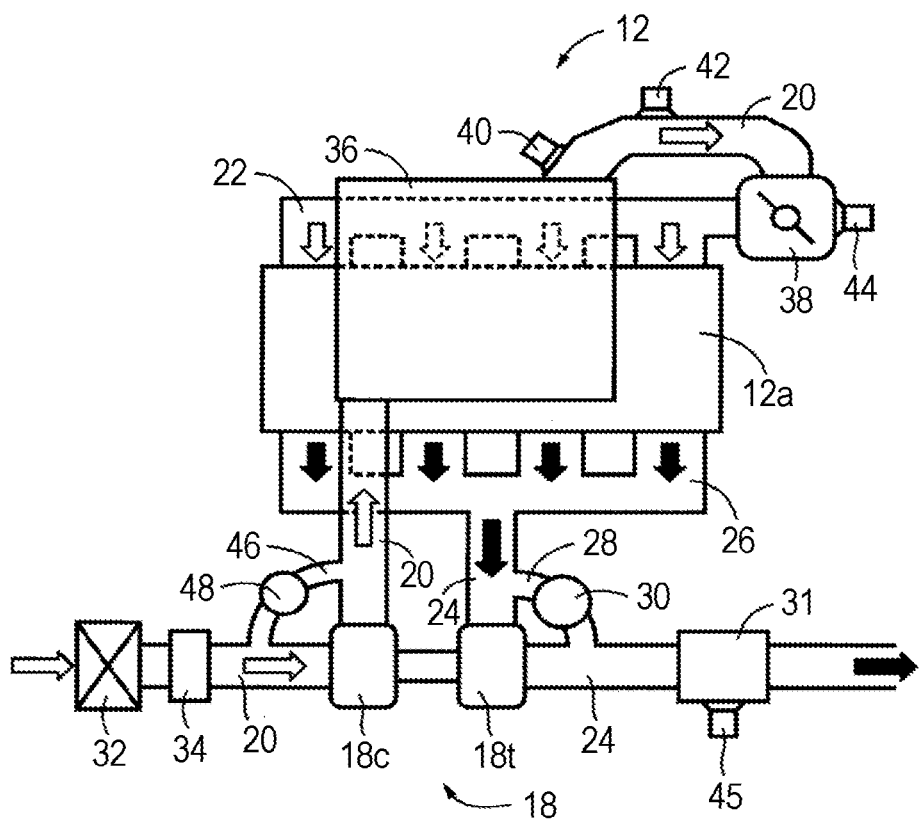
FIG. 2 is a diagram schematically illustrating a configuration of an engine which is mounted in the vehicle.
FIG. 3 is an operation table illustrating a relationship between combinations of a gear shifting operation of a mechanical stepped transmission illustrated in FIG. 1 and operations of engagement devices which are used therein.

FIG. 2 is a diagram schematically illustrating a configuration of the engine 12. In FIG. 2, the engine 12 is a travel power source of the vehicle 10 and is a known internal combustion engine such as a gasoline engine or a diesel engine including a supercharger 18, that is, an engine with the supercharger 18. An intake pipe 20 is provided in an intake system of the engine 12, and the intake pipe 20 is connected to an intake manifold 22 which is attached to an engine body 12a. An exhaust pipe 24 is provided in an exhaust system of the engine 12 and the exhaust pipe 24 is connected to an exhaust manifold 26 which is attached to the engine body 12a. The supercharger 18 is a known exhaust turbine type supercharger, that is, an exhaust-turbine supercharger, including a compressor 18c that is provided in the intake pipe 20 and a turbine 18t that is provided in the exhaust pipe 24. The turbine 18t is rotationally driven by exhaust gas, that is, a flow of exhaust gas. The compressor 18c is connected to the turbine 18t and is rotationally driven by the turbine 18t to compress air suctioned to the engine 12, that is, intake air.

An exhaust bypass 28 that causes exhaust gas to bypass the turbine 18t and to flow from upstream to downstream with respect to the turbine 18t is provided in parallel in the exhaust pipe 24. A waste gate valve (=WGV) 30 that continuously controls a ratio of exhaust gas passing through the exhaust bypass 28 to exhaust gas passing through the turbine 18t is provided in the exhaust bypass 28. A valve opening of the waste gate valve 30 is continuously adjusted by causing an electronic control unit 100 which will be described later and which is provided in a controller for the vehicle 10 to operate an actuator which is not illustrated. As the valve opening of the waste gate valve 30 increases, exhaust gas of the engine 12 is more likely to be discharged via the exhaust bypass 28. Accordingly, in a supercharged state of the engine 12 in which a supercharging operation of the supercharger 18 is effective, a supercharging pressure Pchg from the supercharger 18 decreases as the valve opening of the waste gate valve 30 increases. The supercharging pressure Pchg from the supercharger 18 is a pressure of intake air and is an air pressure downstream from the compressor 18c in the intake pipe 20. A side in which the supercharging pressure Pchg is low is, for example, a side with a pressure of intake air in a non-supercharged state of the engine 12 in which the supercharging operation of the supercharger 18 does not work at all, that is, a side with a pressure of intake air in an engine without the supercharger 18. A catalyst converter 31 is provided downstream in the exhaust pipe 24.

An air cleaner 32 is provided in an inlet of the intake pipe 20, and an air flowmeter 34 that measures an amount of intake air Qair of the engine 12 is provided in the intake pipe 20 downstream from the air cleaner 32 and upstream from the compressor 18c. An intercooler 36 which is a heat exchanger that cools intake air compressed by the supercharger 18 by exchanging heat between intake air and outside air or a coolant is provided in the intake pipe 20 downstream from the compressor 18c. An electronic throttle valve 38 of which opening and closing are controlled by causing the electronic control unit 100 which will be described later to operate a throttle actuator which is not illustrated is provided in the intake pipe 20 downstream from the intercooler 36 and upstream from the intake manifold 22. A supercharging pressure sensor 40 that detects a supercharging pressure Pchg from the supercharger 18 and an intake air temperature sensor 42 that detects an intake air temperature THairin which is the temperature of intake air are provided in the intake pipe 20 between the intercooler 36 and the electronic throttle valve 38. A throttle valve opening sensor 44 that detects a throttle valve opening θth which is an opening of the electronic throttle valve 38 is provided in the vicinity of the electronic throttle valve 38, for example, in a throttle actuator. An exhaust air temperature sensor 45 that detects an exhaust air temperature THairout corresponding to the temperature of the catalyst converter 31 is provided in the catalyst converter 31.

An air recirculation bypass 46 that recirculates air to bypass the compressor 18c is provided in parallel in the intake pipe 20 from downstream to upstream with respect to the compressor 18c. For example, an air bypass valve (=ABV) 48 that is opened at the time of sudden closing of the electronic throttle valve 38 to curb occurrence of a surge and to protect the compressor 18c is provided in the air recirculation bypass 46. A valve opening of the air bypass valve 48 is continuously adjusted by causing the electronic control unit 100 which will be described later to operate an actuator which is not illustrated.

In the engine 12, an engine torque Te which is an output torque of the engine 12 is controlled by causing the electronic control unit 100 which will be described later to control an engine control device 50 (see FIG. 1) including the electronic throttle valve 38, a fuel injection device, an ignition device, the waste gate valve 30, or the air bypass valve 48.

Referring back to FIG. 1, the first rotary machine MG1 and the second rotary machine MG2 are rotary electric machines having a function of an electric motor (a motor) and a function of a power generator (a generator) and are so-called motor generators. The first rotary machine MG1 and the second rotary machine MG2 can serve as a power source for travel of the vehicle 10. The first rotary machine MG1 and the second rotary machine MG2 are connected to a battery 54 which is provided in the vehicle 10 via an inverter 52 which is provided in the vehicle 10. In the first rotary machine MG1 and the second rotary machine MG2, an MG1 torque Tg which is an output torque of the first rotary machine MG1 and an MG2 torque Tm which is an output torque of the second rotary machine MG2 are controlled by causing the electronic control unit 100 which will be described later to control the inverter 52. For example, in the case of forward rotation, an output torque of a rotary machine is a powering torque at a positive torque which is an acceleration side and is a regenerative torque at a negative torque which is a deceleration side. The battery 54 is a power storage device that transmits and receives electric power to and from the first rotary machine MG1 and the second rotary machine MG2. The first rotary machine MG1 and the second rotary machine MG2 are provided in a case 56 which is a non-rotary member attached to the vehicle body.

A power transmission device 16 includes an electrical stepless transmission 58 and a mechanical stepped transmission 60 which are disposed in series on a common axis in a case 56 which is a non-rotary member attached to the vehicle body. The electrical stepless transmission 58 is connected to the engine 12 directly or indirectly via a damper or the like which is not illustrated. The mechanical stepped transmission 60 is connected to an output side of the electrical stepless transmission 58. The power transmission device 16 includes a differential gear unit 64 that is connected to an output shaft 62 which is an output rotary member of the mechanical stepped transmission 60 and an axle 66 that is connected to the differential gear unit 64. In the power transmission device 16, power which is output from the engine 12 or the second rotary machine MG2 is transmitted to the mechanical stepped transmission 60 and is transmitted from the mechanical stepped transmission 60 to the driving wheels 14 via the differential gear unit 64 or the like. The power transmission device 16 having this configuration is used for a vehicle of a front-engine rear-drive (FR) type. In the following description, the electrical stepless transmission 58 is referred to as a stepless transmission 58 and the mechanical stepped transmission 60 is referred to as a stepped transmission 60. Power is synonymous with torque or force when not particularly distinguished. The stepless transmission 58, the stepped transmission 60, or the like is disposed to be substantially symmetric with respect to the common axis, and a lower half with respect to the axis is not illustrated in FIG. 1. The common axis is an axis of a crankshaft of the engine 12, a connection shaft 68 connected to the crankshaft, or the like.

The stepless transmission 58 includes the first rotary machine MG1 and a differential mechanism 72 which is a power split mechanism that mechanically splits power of the engine 12 to the first rotary machine MG1 and an intermediate transmission member 70 which is an output rotary member of the stepless transmission 58. The second rotary machine MG2 is connected to the intermediate transmission member 70 in a power-transmittable manner. The first rotary machine MG1 is a rotary machine to which power of the engine 12 is transmitted. Since the intermediate transmission member 70 is connected to the driving wheels 14 via the stepped transmission 60, the second rotary machine MG2 is a rotary machine that is connected to the driving wheels 14 in a power-transmittable manner. The stepless transmission 58 is an electrical stepless transmission in which a differential state of the differential mechanism 72 is controlled by controlling the operating state of the first rotary machine MG1. The first rotary machine MG1 is a rotary machine that can control an engine rotation speed Ne which is a rotation speed of the engine 12, for example, a rotary machine that can increase the engine rotation speed Ne. The power transmission device 16 transmits power of a power source to the driving wheels 14. Controlling the operating state of the first rotary machine MG1 corresponds to performing operation control of the first rotary machine MG1.

The differential mechanism 72 is constituted by a single-pinion type planetary gear unit and includes a sun gear S0, a carrier CA0, and a ring gear R0. The engine 12 is connected to the carrier CA0 via the connection shaft 68 in a power-transmittable manner, the first rotary machine MG1 is connected to the sun gear S0 in a power-transmittable manner, and the second rotary machine MG2 is connected to the ring gear R0 in a power-transmittable manner. In the differential mechanism 72, the carrier CA0 serves as an input element, the sun gear S0 serves as a reaction element, and the ring gear R0 serves as an output element.

The stepped transmission 60 is an automatic transmission constituting a part of a power transmission path between the intermediate transmission member 70 and the driving wheels 14 and is an automatic transmission constituting a part of a power transmission path between the drive power sources for travel (the engine 12 and the second rotary machine MG2) and the driving wheels 14. The intermediate transmission member 70 also serves as an input rotary member of the stepped transmission 60. Since the second rotary machine MG2 is connected to the intermediate transmission member 70 to rotate integrally or the engine 12 is connected to the input side of the stepless transmission 58, the stepped transmission 60 is an automatic transmission constituting a part of the power transmission path between the second rotary machine MG2 and the engine 12 which are drive power sources for travel and the driving wheels 14. The intermediate transmission member 70 is a transmission member that transmits power of the power source to the driving wheels 14. The stepped transmission 60 is, for example, a known planetary gear type automatic transmission including a plurality of planetary gear units such as a first planetary gear unit 74 and a second planetary gear unit 76 and a plurality of engagement devices such as a one-way clutch F1, a clutch C1, a clutch C2, a brake B1, and a brake B2. In the following description, the clutch C1, the clutch C2, the brake B1, and the brake B2 are simply referred to as engagement devices CB when they are not particularly distinguished from each other.

Each engagement device CB is a hydraulic frictional engagement device which is constituted by a multi-disc or single-disc clutch or brake which is pressed by a hydraulic actuator and a band brake which is tightened by a hydraulic actuator, or the like. The operating state such as an engaged state or a disengaged state of each engagement device CB is switched by adjusted hydraulic pressures Pc1, Pc2, Pb1, and Pb2 of the engagement device CB (see FIG. 6 which will be described later) which are output from a hydraulic pressure control circuit 78 provided in the vehicle 10.

In the stepped transmission 60, rotary elements of the first planetary gear unit 74 and the second planetary gear unit 76 are partially connected to each other directly or indirectly via the engagement device CB or the one-way clutch F1 or are connected to the intermediate transmission member 70, the case 56, or the output shaft 62. The rotary elements of the first planetary gear unit 74 are a sun gear S1, a carrier CA1, and a ring gear R1, and the rotary elements of the second planetary gear unit 76 area a sun gear S2, a carrier CA2, and a ring gear R2.

The stepped transmission 60 is a stepped transmission in which one gear stage out of a plurality of gear shifting stages (also referred to as gear stages) with different gear shifting ratios (also referred to as gear ratios) γat (=AT input rotation speed Ni/output rotation speed No) is formed, for example, by engagement of a predetermined engagement device which is one engagement device out of a plurality of engagement devices. That is, gear stages in the stepped transmission 60 are switched, that is, gear shifting is performed, by causing a plurality of engagement devices to selectively engage with each other. The stepped transmission 60 is a stepped automatic transmission in which each of a plurality of gear stages is formed. In the first embodiment, a gear stage which is formed in the stepped transmission 60 is referred to as an AT gear stage. The AT input rotation speed Ni is an input rotation speed of the stepped transmission 60 which is a rotation speed of the input rotary member of the stepped transmission 60 and has the same value as the rotation speed of the intermediate transmission member 70 and the same value as an MG2 rotation speed Nm which is the rotation speed of the second rotary machine MG2. The AT input rotation speed Ni can be expressed by the MG2 rotation speed Nm. The output rotation speed No is a rotation speed of the output shaft 62 which is an output rotation speed of the stepped transmission 60 and is also an output rotation speed of a composite transmission 80 which is a total transmission including the stepless transmission 58 and the stepped transmission 60. The composite transmission 80 is a transmission constituting a part of the power transmission path between the engine 12 and the driving wheels 14.

In the stepped transmission 60, as illustrated in an engagement operation table of FIG. 3, four forward AT gear stages including a first AT gear stage ("$1^{st}$" in the drawing) to an fourth AT gear stage ("4th" in the drawing) are formed as a plurality of AT gear stages. The gear ratio γat of the first AT gear stage is the highest and the gear ratio γat becomes lower in higher AT gear stages. A reverse AT gear stage ("Rev" in the drawing) is formed, for example, by engagement of the clutch C1 and engagement of the brake B2. That is, as will be described later, for example, the first AT gear stage is formed at the time of reverse travel. The engagement operation table illustrated in FIG. 3 is obtained by collecting relationships between the AT gear stages and the operation states of the plurality of engagement devices. That is, the engagement operation table illustrated in FIG. 3 is obtained by collecting relationships between the AT gear stages and predetermined engagement devices which are engagement devices which are engaged in the AT gear stages. In FIG. 3, "O" denotes engagement, "Δ" denotes engagement at the time of engine braking or at the time of coast downshift of the stepped transmission 60, and a blank denotes disengagement.

In the stepped transmission 60, an AT gear stage which is formed according to a driver's operation of an accelerator or a vehicle speed V, or the like is switched, that is, a plurality of AT gear stages are selectively formed, by an electronic control unit 100 which will be described later. For example, in gear shifting control of the stepped transmission 60, gear shifting is performed by switching one of the engagement devices CB, that is, so-called clutch-to-clutch gear shifting in which gear shifting is performed by switching of the engagement device CB between engagement and disengagement is performed. In the first embodiment, for example, downshift from the second AT gear stage to the first AT gear stage is denoted by 2→1 downshift. The same is true of other upshift or downshift.

The vehicle 10 includes, for example, a one-way clutch F0, an MOP 82 which is a mechanical oil pump, and an EOP 84 which is an electrical oil pump.

The one-way clutch F0 is a lock mechanism that can fix the carrier CA0 to be non-rotatable. That is, the one-way clutch F0 is a lock mechanism that can fix the connection shaft 68 which is connected to the crankshaft of the engine 12 and which rotates integrally with the carrier CA0 to the case 56. In the one-way clutch F0, one member of two members that are rotatable relative to each other is integrally connected to the connection shaft 68 and the other member is integrally connected to the case 56. The one-way clutch F0 idles in a positive rotating direction which is a rotating direction at the time of operation of the engine 12 and is automatically engaged in a negative rotating direction which is opposite to that at the time of operation of the engine 12. Accordingly, at the time of idling of the one-way clutch F0, the engine 12 is rotatable relative to the case 56. On the other hand, at the time of engagement of the one-way clutch F0, the engine 12 is not rotatable relative to the case 56. That is, the engine 12 is fixed to the case 56 by engagement of the one-way clutch F0. In this way, the one-way clutch F0 permits rotation in the positive rotating direction of the carrier CA0 which is a rotating direction at the time of operation of the engine 12 and prohibits rotation in the negative rotating direction of the carrier CA0. That is, the one-way clutch F0 is a lock mechanism that can permit rotation in the positive rotating direction of the engine 12 and prohibit rotation in the negative rotating direction.

The MOP 82 is connected to the connection shaft 68, rotates with rotation of the engine 12, and ejects a hydraulic oil which is used for the power transmission device 16. The MOP 82 is rotated, for example, by the engine 12 to eject a hydraulic oil. The EOP 84 is rotated by a dedicated motor 86 for an oil pump provided in the vehicle 10 and ejects a hydraulic oil. The hydraulic oil which is ejected by the MOP 82 or the EOP 84 is supplied to the hydraulic pressure control circuit 78 (see FIG. 6 which will be described later). The operation states of the engagement devices CB are switched by the hydraulic pressures Pc1, Pc2, Pb1, Pb2 which are adjusted by the hydraulic pressure control circuit 78 based on the hydraulic oil.

Figures 4, 5:
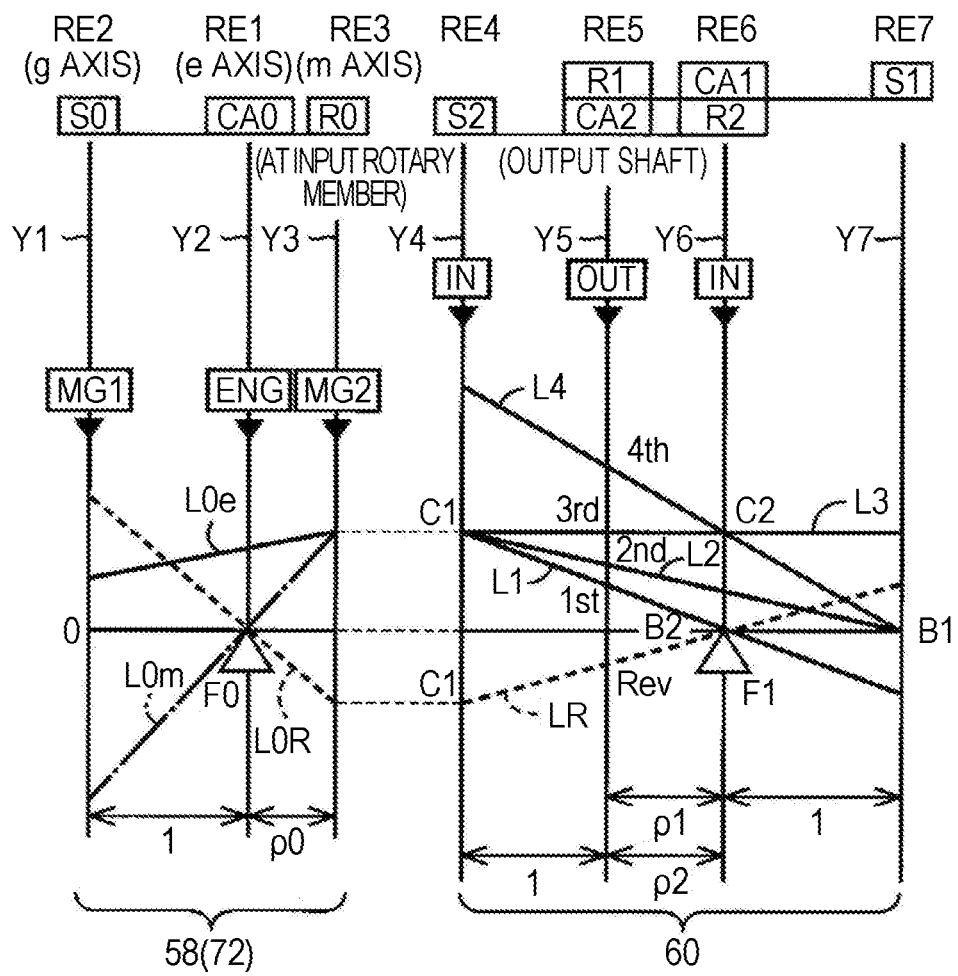
FIG. 4 is a collinear diagram illustrating a relative relationship between rotation speeds of rotary elements in an electrical stepless transmission and the mechanical stepped transmission which are mounted in the vehicle.
FIG. 5 is a diagram illustrating an example of a gear stage allocation table in which a plurality of mock gear stages is allocated to a plurality of AT gear stages in the mechanical stepped transmission.

FIG. 4 is a diagram illustrating a relative relationship between rotation speeds of the rotary elements in the stepless transmission 58 and the stepped transmission 60. In FIG. 4, three vertical lines Y1, Y2, Y3 corresponding to three rotary elements of the differential mechanism 72 constituting the stepless transmission 58 are a g axis indicating the rotation speed of the sun gear S0 corresponding to the second rotary element RE2, an e axis indicating the rotation speed of the carrier CA0 corresponding to the first rotary element RE1, and an m axis indicating the rotation speed of the ring gear R0 (that is, the input rotation speed of the stepped transmission 60) corresponding to the third rotary element RE3, respectively, sequentially from the left. Four vertical lines Y4, Y5, Y6, Y7 of the stepped transmission 60 are axes indicating the rotation speed of the sun gear S2 corresponding to the fourth rotary element RE4, the rotation speed of the ring gear R1 and the carrier CA2 (that is, the rotation speed of the output shaft 62) connected to each other and corresponding to the fifth rotary element RE5, the rotation speed of the carrier CA1 and the ring gear R2 connected to each other and corresponding to the sixth rotary element RE6, and the rotation speed of the sun gear S1 corresponding to the seventh rotary element RE7, respectively, sequentially from the left. The gaps between the vertical lines Y1, Y2, Y3 are determined according to a gear ratio $\rho 0$ of the differential mechanism 72. The gaps between the vertical lines Y4, Y5, Y6, Y7 are determined according to gear ratios $\rho 1$, $\rho 2$ of the first and second planetary gear units 74, 76. In the relationship between the vertical axes in the diagram, when the gap between a sun gear and a carrier corresponds to "1," the gap between the carrier and a ring gear corresponds to a gear ratio $\rho$ of a planetary gear unit (=number of teeth of the sun gear/number of teeth of the ring gear).

With reference to the diagram illustrated in FIG. 4, in the differential mechanism 72 of the stepless transmission 58, the engine 12 (see "ENG" in the drawing) is connected to the first rotary element RE1, the first rotary machine MG1 (see "MG1" in the drawing) is connected to the second rotary element RE2, the second rotary machine MG2 (see "MG2" in the drawing) is connected to the third rotary element RE3 which rotates integrally with the intermediate transmission member 70, and rotation of the engine 12 is transmitted to the stepped transmission 60 via the intermediate transmission member 70. In the stepless transmission 58, a relationship between the rotation speed of the sun gear S0 and the rotation speed of the ring gear R0 is represented by the straight lines L0e, L0m, L0R crossing the vertical line Y2.

In the stepped transmission 60, the fourth rotary element RE4 is selectively connected to the intermediate transmission member 70 via the clutch C1, the fifth rotary element RE5 is connected to the output shaft 62, the sixth rotary element RE6 is selectively connected to the intermediate transmission member 70 via the clutch C2 and selectively connected to the case 56 via the brake B2, and the seventh rotary element RE7 is selectively connected to the case 56 via the brake B1. In the stepped transmission 60, the rotation speeds of "1st", "2nd", "3rd", "4th", "Rev" in the output shaft 62 are denoted by the straight lines L1, L2, L3, L4, LR crossing the vertical line Y5 through engagement/disengagement control of the engagement devices CB.

The straight line L0e and the straight lines L1, L2, L3, L4 which are indicated by solid lines in FIG. 4 denote relative speeds of the rotary elements at the time of forward travel in a hybrid travel (=HV travel) mode in which hybrid travel using at least the engine 12 as a power source is possible. In the hybrid travel mode, in the differential mechanism 72, when an MG1 torque Tg which is a reaction torque is input to the sun gear S0 as a negative torque of the first rotary machine MG1 with respect to an engine torque Te which is input to the carrier CA0 as a positive torque, a direct engine-transmitted torque Td $(=Te/(1+\rho 0)=-(1/\rho 0)\times Tg)$ which is a positive torque at the time of forward rotation appears in the ring gear R0. A combined torque of the direct engine-transmitted torque Td and the MG2 torque Tm is transmitted as a drive torque in the forward direction of the vehicle 10 to the driving wheels 14 via the stepped transmission 60 in which one AT gear stage out of the first AT gear stage to the fourth AT gear stage is formed according to a required drive power. The first rotary machine MG1 serves as a power generator when a negative torque is generated at the time of positive rotation. A generated electric power Wg of the first rotary machine MG1 charges the battery 54 or is consumed in the second rotary machine MG2. The second rotary machine MG2 outputs the MG2 torque Tm using all or some of the generated electric power Wg or electric power from the battery 54 in addition to the generated electric power Wg.

The straight line L0m indicated by an alternate long and short dash line in FIG. 4 and the straight lines L1, L2, L3, L4 indicated by solid lines in FIG. 4 denote relative speeds of the rotary elements at the time of forward travel in a motor-driven travel (=EV travel) mode in which motor-driven travel using at least one rotary machine of the first rotary machine MG1 and the second rotary machine MG2 as a power source in a state in which the operation of the engine 12 is stopped is possible. The motor-driven travel at the time of forward travel in the motor-driven traveling mode includes, for example, single-motor-driven travel using only the second rotary machine MG2 as a power source and two-motor-driven travel using both the first rotary machine MG1 and the second rotary machine MG2 as a power source. In the single-motor-driven travel, the carrier CA0 does not rotate and the MG2 torque Tm which is a positive torque at the time of positive rotation is input to the ring gear R0. At this time, the first rotary machine MG1 connected to the sun gear S0 enters a no-load state and idles at the time of negative rotation. In the single-motor-driven travel, the one-way clutch F0 is disengaged and the connection shaft 68 is not fixed to the case 56. In the two-motor-driven travel, when the MG1 torque Tg which is a negative torque at the time of negative rotation is input to the sun gear S0 in a state in which the carrier CA0 does not rotate, the one-way clutch F0 is automatically engaged such that rotation in the negative rotating direction of the carrier CA0 is prohibited. In the state in which the carrier CA0 is fixed not to be rotatable by engagement of the one-way clutch F0, a reaction torque based on the MG1 torque Tg is input to the ring gear R0. In the two-motor-driven travel, similarly to the single-motor-driven travel, the MG2 torque Tm is input to the ring gear R0. When the MG1 torque Tg which is a negative torque at the time of negative rotation is input to the sun gear S0 in a state in which the carrier CA0 does not rotate and the MG2 torque Tm is not input thereto, the single-motor-driven travel using the MG1 torque Tg is also possible. In forward travel in the motor-driven travel mode, the engine 12 is not driven, the engine rotation speed Ne is zero, and at least one torque of the MG1 torque Tg and the MG2 torque Tm is transmitted as a drive torque in the forward travel direction of the vehicle 10 to the driving wheels 14 via the stepped transmission 60 in which one AT gear stage out of the AT first gear stage to the fourth AT gear stage is formed. In forward travel in the motor-driven travel mode, the MG1 torque Tg is a powering torque which is a negative torque at the time of negative rotation and the MG2 torque Tm is a powering torque which is a positive torque at the time of positive rotation.

The straight line L0R and the straight line LR indicated by dotted lines in FIG. 4 denote relative speeds of the rotary elements at the time of reverse travel in the motor-driven travel mode. In the reverse travel in the motor-driven travel mode, an MG2 torque Tm which is a negative torque at the time of negative rotation is input to the ring gear R0 and the MG2 torque Tm is transmitted as a drive torque in the reverse travel direction of the vehicle 10 to the driving wheels 14 via the stepped transmission 60 in which the first AT gear stage is formed. In the vehicle 10, by outputting an MG2 torque Tm for reverse travel of which the signs are opposite to the MG2 torque Tm for forward travel at the time forward travel from the second rotary machine MG2, for example, in a state in which the first AT gear stage which is a low-side AT gear stage for forward travel out of a plurality of AT gear stages is formed by the electronic control unit 100 which will be described later, it is possible to perform reverse travel. In the reverse travel in the motor-driven travel mode, the MG2 torque Tm is a powering torque which is a negative torque at the time of negative rotation. In the hybrid travel mode, since the second rotary machine MG2 can be negatively rotated as indicated by the straight line L0R, it is possible to perform reverse travel as in the motor-driven travel mode.

In the power transmission device 16, the stepless transmission 58 includes the differential mechanism 72 including three rotary elements such as the carrier CA0 serving as the first rotary element RE1 that is connected to the engine 12 in a power-transmittable manner, the sun gear S0 serving as the second rotary element RE2 that is connected to the first rotary machine MG1 in a power-transmittable manner, and the ring gear R0 serving as the third rotary element RE3 that is connected to the intermediate transmission member 70, and is constituted as an electrical gear shifting mechanism in which a differential state of the differential mechanism 72 is controlled by controlling the operating state of the first rotary machine MG1. In other words, the third rotary element RE3 that is connected to the intermediate transmission member 70 is a third rotary element RE3 that is connected to the second rotary machine MG2 in a power-transmittable manner. That is, in the power transmission device 16, the stepless transmission 58 which includes the differential mechanism 72 that is connected to the engine 12 in a power-transmittable manner and the first rotary machine MG1 that is connected to the differential mechanism 72 in a power-transmittable manner and in which the differential state of the differential mechanism 72 is controlled by controlling the operating state of the first rotary machine MG1 is constituted. The stepless transmission 58 serves as an electrical stepless transmission in which a gear ratio $\gamma 0$ (=Ne/Nm) which is a value of a ratio of the engine rotation speed Ne which has the same value as the rotation speed of the connection shaft 68 serving as an input rotary member to an MG2 rotation speed Nm which is the rotation speed of the intermediate transmission member 70 serving as an output rotary member changes.

For example, in the hybrid travel mode, when the rotation speed of the sun gear S0 increases or decreases by controlling the rotation speed of the first rotary machine MG1 with respect to the rotation speed of the ring gear R0 which is constrained to rotation of the driving wheels 14 with formation of an AT gear stage in the stepped transmission 60, the rotation speed of the carrier CA0, that is, the engine rotation speed Ne, increases or decreases. Accordingly, in hybrid travel, the engine 12 can operate at an engine operating point OPeng with high efficiency. The operating point is an operating point which is expressed by a rotation speed and a torque, and the engine operating appoint OPeng is an operating point of the engine 12 which is expressed by the engine rotation speed Ne and the engine torque Te. In the power transmission device 16, the composite transmission 80 in which the stepless transmission 58 and the stepped transmission 60 are arranged in a series as a whole can constitute a stepless transmission with the stepped transmission 60 in which an AT gear stage is formed and the stepless transmission 58 which operates as a stepless transmission.

Alternatively, since the stepless transmission 58 can also perform gear shifting like the stepped transmission, the composite transmission 80 including the stepped transmission 60 in which an AT gear stage is formed and the stepless transmission 58 that performs gear shifting like a stepped transmission as a whole in the power transmission device 16 can perform gear shifting like a stepped transmission. That is, in the composite transmission 80, the stepped transmission 60 and the stepless transmission 58 can be controlled such that a plurality of gear stages with different gear ratios $\gamma t$ (=Ne/No) which indicates a value of a ratio of the engine rotation speed Ne to the output rotation speed No. In the first embodiment, a gear stage which is formed in the composite transmission 80 is referred to as a mock gear stage. The gear ratio $\gamma t$ is a total gear ratio which is formed by the stepless transmission 58 and the stepped transmission 60 which are arranged in series and has a value ($\gamma t=\gamma 0 \times \gamma at$) which is obtained by multiplying the gear ratio $\gamma 0$ of the stepless transmission 58 and the gear ratio $\gamma at$ of the stepped transmission 60.

For example, the mock gear stages are allocated to each AT gear stage of the stepped transmission 60 such that one or more types of mock gear stages are formed by combination of the AT gear stages of the stepped transmission 60 and a plurality of types of gear ratio $\gamma 0$ of the stepless transmission 58. For example, FIG. 5 illustrates an example of a gear stage allocation table. In FIG. 5, in upshift of the composite transmission 80, it is determined in advance that first to third mock gear stages are formed for the first AT gear stage, fourth to sixth mock gear stages are formed for the second AT gear stage, seventh to ninth mock gear stages are formed for the third AT gear stage, and a tenth mock gear stage is formed for the fourth AT gear stage. In downshift of the composite transmission 80, it is determined in advance that first to second mock gear stages are formed for the first AT gear stage, third to fifth mock gear stages are formed for the second AT gear stage, sixth to eighth mock gear stages are formed for the third AT gear stage, and ninth to tenth mock gear stages are formed for the fourth AT gear stage. In the composite transmission 80, different mock gear stages are formed at a certain AT gear stage by controlling the stepless transmission 58 such that the engine rotation speed Ne capable of realizing a predetermined gear ratio γt with respect to the output rotation speed No is obtained. In the composite transmission 80, the mock gear stage is switched by controlling the stepless transmission 58 according to switching of the AT gear stage. In FIG. 5, an example in which the mock gear stages which are allocated to the AT gear stages vary in upshift and downshift is illustrated, but the same mock gear stages may be allocated.

Referring back to FIG. 1, the vehicle 10 includes an electronic control unit 100 serving as a controller included in the vehicle 10 associated with control of the engine 12, the stepless transmission 58, the stepped transmission 60, and the like. Accordingly, FIG. 1 is a diagram illustrating an input and output system of the electronic control unit 100 and is a functional block diagram illustrating principal parts of the control function of the electronic control unit 100. The electronic control unit 100 is configured to include a so-called microcomputer including, for example, a CPU, a RAM, a ROM, and an input and output interface, and the CPU performs various types of control of the vehicle 10 by performing signal processing in accordance with a program which is stored in the ROM in advance while using a temporary storage function of the RANI. The electronic control unit 100 is configured to include a computer for engine control, a computer for rotary machine control, and a computer for hydraulic pressure control according to necessity. The electronic control unit 100 is an example of a controller in the disclosure.

The electronic control unit 100 is supplied with various signals (for example, an intake air amount Qair, a supercharging pressure Pchg, an intake air temperature THairin, a throttle valve opening θth, an exhaust air temperature THairout corresponding to a temperature of a catalyst converter 31, an engine rotation speed Ne, a crank angle Acr indicating a rotational position of a crankshaft of the engine 12, a knocking detection signal Vf that is detected at the time of occurrence of knocking of the engine 12, an output rotation speed No corresponding to a vehicle speed V, an MG1 rotation speed Ng which is the rotation speed of the first rotary machine MG1, an MG2 rotation speed Nm with the same value as the AT input rotation speed Ni, an accelerator operation amount θacc which is an accelerator operation amount by a driver indicating the magnitude of the driver's acceleration operation, a battery temperature THbat, a battery charging/discharging current Ibat, and a battery voltage Vbat of the battery 54, and a hydraulic oil temperature THoil which is the temperature of a hydraulic oil) based on detection values from various sensors (for example, the air flowmeter 34, the supercharging pressure sensor 40, the intake air temperature sensor 42, the throttle valve opening sensor 44, the exhaust air temperature sensor 45, the engine rotation speed sensor 88, the knocking sensor 89, the output rotation speed sensor 90, the MG1 rotation speed sensor 92, the MG2 rotation speed sensor 94, the accelerator opening sensor 96, the battery sensor 98, and the oil temperature sensor 99) which are provided in the vehicle 10.

The electronic control unit 100 outputs various command signals (for example, an engine control command signal Se for controlling the engine 12, a rotary machine control command signal Smg for controlling the first rotary machine MG1 and the second rotary machine MG2, a hydraulic pressure control command signal Sat for controlling the operating state of the engagement device CB, and an EOP control command signal Seop for controlling the operation of the EOP 84) to various devices (for example, the engine control device 50, the inverter 52, the hydraulic pressure control circuit 78, and the motor 86) which are provided in the vehicle 10. The hydraulic pressure control command signal Sat is also a hydraulic pressure control command signal for controlling gear shifting of the stepped transmission 60 and is also, for example, a command signal for driving solenoid valves SL1 to SL4 (see FIG. 6 which will be described later) that adjust hydraulic pressures Pc1, Pc2, Pb1, and Pb2 which are supplied to hydraulic actuators of the engagement devices CB. The electronic control unit 100 sets hydraulic pressure instruction values corresponding to the values of the hydraulic pressures Pc1, Pc2, Pb1, and Pb2 and outputs driving currents or driving voltages corresponding to the hydraulic pressure instruction values to the hydraulic pressure control circuit 78.

The electronic control unit 100 calculates a state of charge (SOC) value SOC [%] which is a value indicating the state of charge of the battery 54, for example, based on the battery charging/discharging current Ibat and the battery voltage Vbat. The state of charge value SOC corresponds to an amount of electric power stored in the battery 54, that is, an amount of electric power charged in the battery 54. The electronic control unit 100 calculates chargeable and dischargeable powers Win and Wout for defining a feasible range of the battery power Pbat which is the power of the battery 54, for example, based on the battery temperature THbat and the SOC value SOC of the battery 54. The chargeable and dischargeable powers Win and Wout include a chargeable power Win which is a possible input power for defining limitation of an input power of the battery 54 and a dischargeable power Wout which is a possible output power for defining limitation of an output power of the battery 54. For example, the chargeable and dischargeable powers Win and Wout decrease as the battery temperature THbat decreases in a low-temperature area in which the battery temperature THbat is lower than that in a normal area, and decreases as the battery temperature THbat increases in a high-temperature area in which the battery temperature THbat is higher than that in the normal area. For example, the chargeable power Win decreases as the SOC value SOC increases in an area in which the SOC value SOC is high. For example, the dischargeable power Wout decreases as the SOC value SOC decreases in an area in which the SOC value SOC is low.

Figure 6:
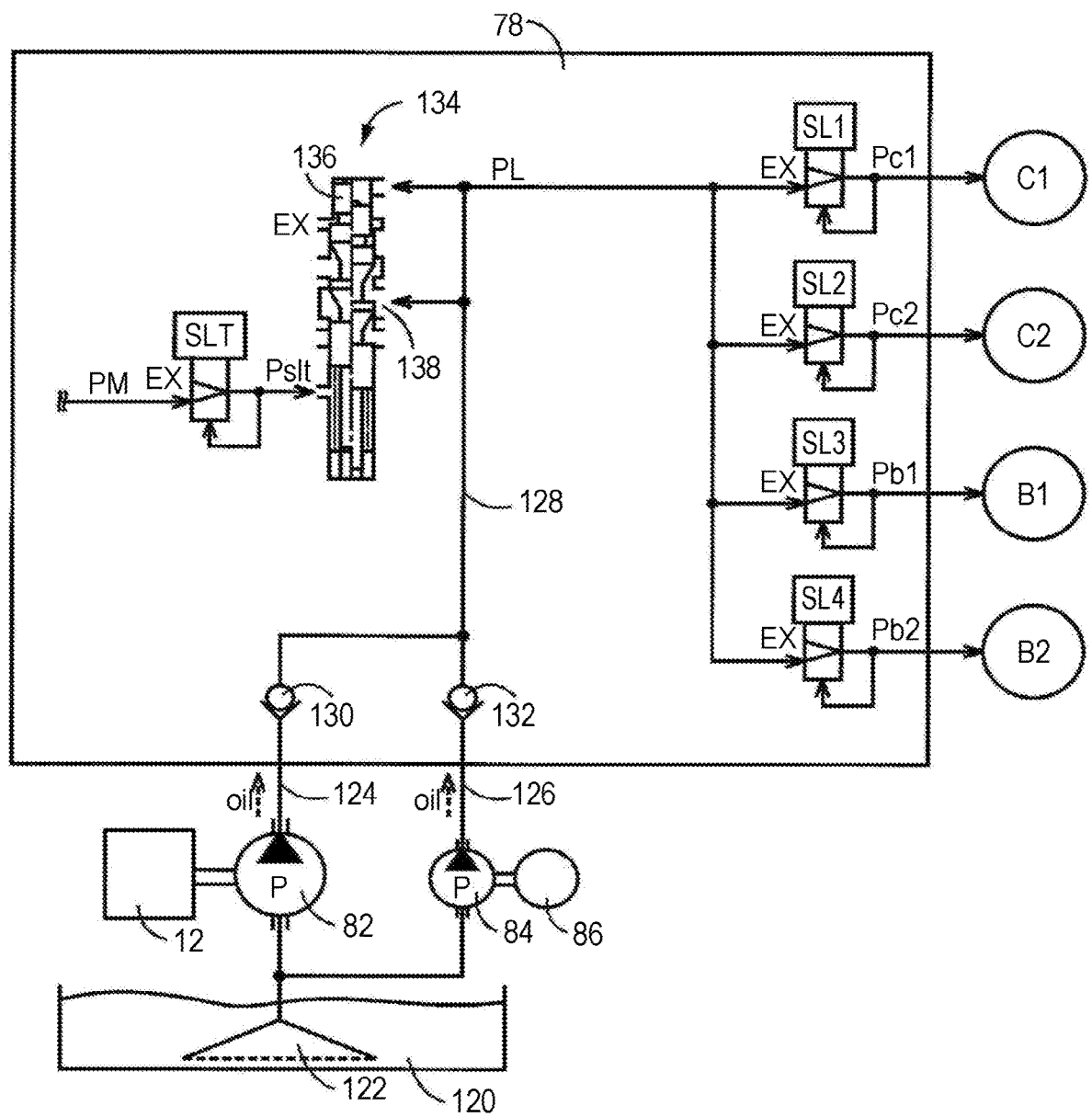
FIG. 6 is a diagram illustrating a hydraulic pressure control circuit of a power transmission device which is mounted in the vehicle and illustrating a hydraulic pressure source which supplies a hydraulic oil to the hydraulic pressure control circuit.

FIG. 6 is a diagram illustrating the hydraulic pressure control circuit 78 and is a diagram illustrating a hydraulic pressure source that supplies a hydraulic oil to the hydraulic pressure control circuit 78. In FIG. 6, the MOP 82 and the EOP 84 are provided in parallel in the structure of an oil passage in which the hydraulic oil flows. The MOP 82 and the EOP 84 eject a hydraulic oil serving as a source of a hydraulic pressure for switching the operating states of the engagement devices CB or supplying a lubricant to the units of the power transmission device 16. The MOP 82 and the EOP 84 suction up a hydraulic oil circulating to an oil pan 120 which is provided in a lower part of the case 56 via a strainer 122 which is a common inlet and eject the hydraulic oil to ejection oil passages 124, 126. The ejection oil passages 124, 126 are connected to an oil passage of the hydraulic pressure control circuit 78, for example, a line-pressure oil passage 128 as an oil passage in which a line pressure PL flows. The ejection oil passage 124 to which the hydraulic oil is ejected from the MOP 82 is connected to the line-pressure oil passage 128 via an MOP check valve 130 which is provided in the hydraulic pressure control circuit

78. The ejection oil passage 126 to which the hydraulic oil is ejected from the EOP 84 is connected to the line-pressure oil passage 128 via an EOP check valve 132 which is provided in the hydraulic pressure control circuit 78. The MOP 82 rotates along with the engine 12 and is rotationally driven by the engine 12 to generate a hydraulic oil pressure. The EOP 84 is rotationally driven by the motor 86 regardless of the rotating state of the engine 12 to generate a hydraulic oil pressure. The EOP 84 operates, for example, at the time of travel in the motor-driven travel mode.

The hydraulic pressure control circuit 78 includes a regulator valve 134 and the solenoid valves SLT, SL1 to SL4 in addition to the line-pressure oil passage 128, the MOP check valve 130, and the EOP check valve 132.

The regulator valve 134 regulates the line pressure PL based on the hydraulic oil which is ejected from at least one of the MOP 82 and the EOP 84. The solenoid valve SLT is, for example, a linear solenoid valve and is controlled by the electronic control unit 100 such that a pilot pressure Pslt based on an accelerator operation amount $\theta acc$, an input torque of the stepped transmission 60, or the like is input to the regulator valve 134. In the regulator valve 134, a spool 136 is biased by the pilot pressure Pslt and the spool 136 moves in an axial direction with change in an opening area of a discharge flow passage 138, whereby the line pressure PL is regulated based on the pilot pressure Pslt. Accordingly, the line pressure PL is a hydraulic pressure based on the accelerator operation amount $\theta acc$, the input torque of the stepped transmission 60, or the like. A source pressure which is input to the solenoid valve SLT is a modulator pressure PM which is regulated to a constant value by a modulator valve which is not illustrated, for example, using the line pressure PL as a source pressure.

The solenoid valves SL1 to SL4 are, for example, linear solenoid valves and is controlled by the electronic control unit 100 such that the hydraulic pressures Pc1, Pc2, Pb1, Pb2 of the engagement devices CB are output using the line pressure PL supplied via the line-pressure oil passage 128 as a source pressure. The solenoid valve SL1 regulates a C1 hydraulic pressure Pc1 which is supplied to a hydraulic actuator of the clutch C1. The solenoid valve SL2 regulates a C2 hydraulic pressure Pc2 which is supplied to a hydraulic actuator of the clutch C2. The solenoid valve SL3 regulates a B1 hydraulic pressure Pb1 which is supplied to a hydraulic actuator of the brake B1. The solenoid valve SL4 regulates a B2 hydraulic pressure Pb2 which is supplied to a hydraulic actuator of the brake B2.

Referring back to FIG. 1, the electronic control unit 100 functionally includes an AT gear shifting control unit 102 and a hybrid control unit 104 in order to realize various types of control in the vehicle 10.

The AT gear shifting control unit 102 performs determination of gear shifting of the stepped transmission 60, for example, using an AT gear stage shifting map which is a relationship which is acquired in advance by experiment or design and stored, that is, a predetermined relationship, and performs gear shifting control of the stepped transmission 60 according to necessity. The AT gear shifting control unit 102 outputs a hydraulic pressure control command signal Sat for switching between engagement and disengagement of the engagement devices CB using the solenoid valves SL1 to SL4 to the hydraulic pressure control circuit 78 such that the AT gear stage of the stepped transmission 60 is automatically switched in gear shifting control of the stepped transmission 60. The AT gear stage shifting map is, for example, a predetermined relationship in which gear shifting lines for determining gear shifting of the stepped transmission 60 are arranged on a two-dimensional coordinate system with the output rotation speed No and the accelerator operation amount $\theta acc$ as variables. Here, the vehicle speed V or the like may be used instead of the output rotation speed No or a required drive torque Twdem, a throttle valve opening $\theta th$, or the like may be used instead of the accelerator operation amount $\theta acc$. The gear shifting lines in the AT gear stage shifting map are an upshift line for determining upshift and a downshift line for determining downshift. Each gear shifting line is for determining whether the output rotation speed No crosses the line indicating the accelerator operation amount $\theta acc$ or whether the accelerator operation amount $\theta acc$ crosses a line indicating a certain output rotation speed No, that is, whether the accelerator operation amount $\theta acc$ crosses a gear shifting point which is a value at which gear shifting on the gear shifting line is to be performed, and is determined in advance as continuity of such gear shifting points.

The hybrid control unit 104 has a function of an engine control unit that controls the operation of the engine 12 and a function of a rotary machine control unit that controls the operations of the first rotary machine MG1 and the second rotary machine MG2 via the inverter 52. THe hybrid control unit 104 performs hybrid drive control or the like using the engine 12, the first rotary machine MG1, and the second rotary machine MG2 based on such control functions.

The hybrid control unit 104 calculates a required drive torque Twdem which is a drive torque Tw required for the vehicle 10 by applying the accelerator operation amount $\theta acc$ and the vehicle speed V to, for example, a drive power map which is a predetermined relationship. In other words, the required drive torque Twdem is a required drive power Pwdem at the vehicle speed V at that time. Here, the output rotation speed No or the like may be used instead of the vehicle speed V. The hybrid control unit 104 outputs an engine control command signal Se which is a command signal for controlling the engine 12 and a rotary machine control command signal Smg which is a command signal for controlling the first rotary machine MG1 and the second rotary machine MG2 such that the required drive power Pwdem is realized by at least one power source of the engine 12, the first rotary machine MG1, and the second rotary machine MG2 in consideration of a required charging/discharging power which is a charging/discharging power required for the battery 54, the like. For example, the engine control command signal Se is a command value of an engine power Pe which is the power of the engine 12 that outputs the engine torque Te at the engine rotation speed Ne at that time. The rotary machine control command signal Smg is, for example, a command value of a generated electric power Wg of the first rotary machine MG1 that outputs the MG1 torque Tg at the MG1 rotation speed Ng at the time of outputting the command as a reaction torque of the engine torque Te and is a command value of power consumption Wm of the second rotary machine MG2 that outputs the MG2 torque Tm at the MG2 rotation speed Nm at the time of outputting the command.

For example, when the stepless transmission 58 operates as a stepless transmission and the composite transmission 80 as a whole operates as a stepless transmission, the hybrid control unit 104 controls the engine 12 such that the required engine power Pedem in consideration of the required charging/discharging power or the charging/discharging efficiency in the battery 54, or the like in addition to the required drive power Pwdem is realized and an engine power Pe for outputting a target engine torque Tetgt at a target engine rotation speed Netgt in consideration of an optimal engine operating point OPengf or the like is achieved. The hybrid control unit 104 performs stepless gear shifting control of the stepless transmission 58 to change the gear ratio $\gamma 0$ of the stepless transmission 58 by controlling the generated electric power Wg of the first rotary machine MG1 such that the MG1 torque Tg for causing the engine rotation speed Ne to approach the target engine rotation speed Netgt is output. As the result of such control, the gear ratio $\gamma$ of the composite transmission 80 when it operates as a stepless transmission is controlled. The MG1 torque Tg when the composite transmission 80 as a whole operates as a stepless transmission is calculated, for example, in feedback control in which the first rotary machine MG1 operates such that the engine rotation speed Ne approaches the target engine rotation speed Netgt. The MG2 torque Tm when the composite transmission 80 as a whole operates as a stepless transmission is calculated such that the required drive torque Twdem is obtained in conjunction with the drive torque Tw based on the direct engine-transmitted torque Td.

The optimal engine operating point OPengf is determined in advance, for example, as an engine operating point OPeng at which total fuel efficiency in the vehicle 10 in consideration of charging/discharging efficiency in the battery 54 in addition to fuel efficiency of only the engine 12 is best when a required engine power Pedem is realized. The target engine rotation speed Netgt is a target value of the engine rotation speed Ne, and the target engine torque Tetgt is a target value of the engine torque Te.

Figure 7:
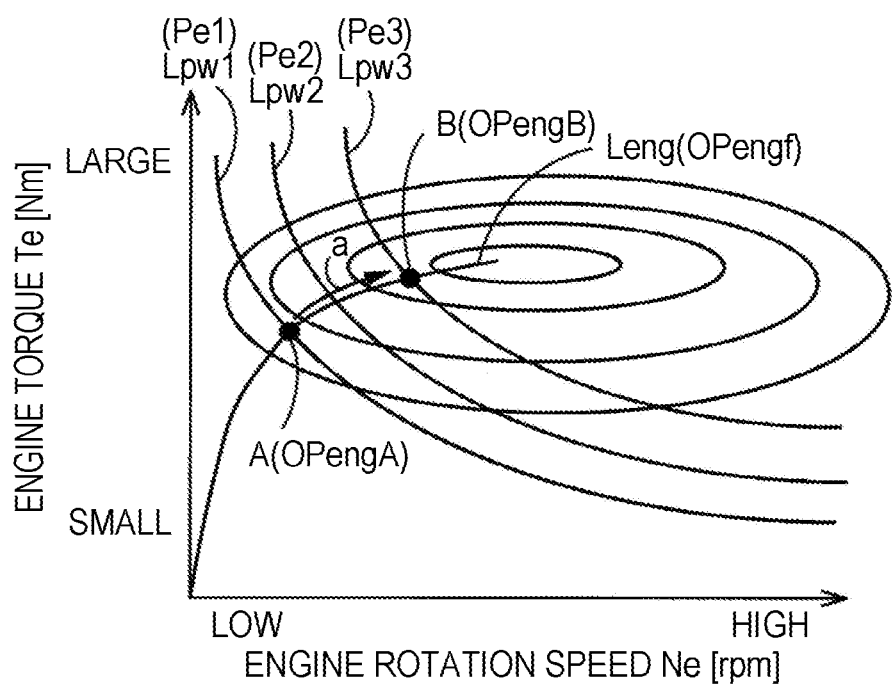
FIG. 7 is a diagram illustrating an example of an optimal engine operating point of the engine.

FIG. 7 is a diagram illustrating an example of the optimal engine operating point OPengf on a two-dimensional coordinate system with the engine rotation speed Ne and the engine torque Te as variables. In FIG. 7, a solid line Leng denotes a group of optimal engine operating points OPengf. Equi-power lines Lpw1, Lpw2, Lpw3 denote examples in which the required engine power Pedem is required engine powers Pe1, Pe2, Pe3, respectively. A point A is an engine operating point OPengA when the required engine power Pe1 is realized on the optimal engine operating point OPengf, and a point B is an engine operating point OPengB when the required engine power Pe3 is realized on the optimal engine operating point OPengf. The points A, B are also target values of the engine operating point OPeng which is expressed by the target engine rotation speed Netgt and the target engine torque Tetgt, that is, a target engine operating point OPengtgt. For example, when the target engine operating point OPengtgt changes from the point A to the point B with an increase in the accelerator operation amount θacc, the engine operating point OPeng is controlled such that it changes to a path a passing through the optimal engine operating point OPengf.

For example, when the stepless transmission 58 performs gear shifting like a stepped transmission and the composite transmission 80 as a whole performs gear shifting like a stepped transmission, the hybrid control unit 104 determines gear shifting of the composite transmission 80, for example, using a mock gear stage shifting map which is a predetermined relationship and performs gear shifting control of the stepless transmission 58 such that a plurality of mock gear stages is selectively formed in cooperation with gear shifting control of the AT gear stages of the stepped transmission 60 which is performed by the AT gear shifting control unit 102. A plurality of mock gear stages can be formed by controlling the engine rotation speed Ne using the first rotary machine MG1 based on the output rotation speed No such that the gear ratios $\gamma t$ thereof can be maintained. The gear ratio $\gamma t$ of each mock gear stage does have to be constant in the overall range of the output rotation speed No and may be changed in a predetermined range or may be limited to an upper limit or a lower limit of the rotation speed of each part. The plurality of mock gear stages has only to control the engine rotation speed Ne based on the output rotation speed No and a predetermined mock gear stage can be formed regardless of the types of the AT gear stages of the stepped transmission 60. In this way, the hybrid control unit 104 can perform gear shifting control such that the engine rotation speed Ne changes like stepped gear shifting.

Figure 8:
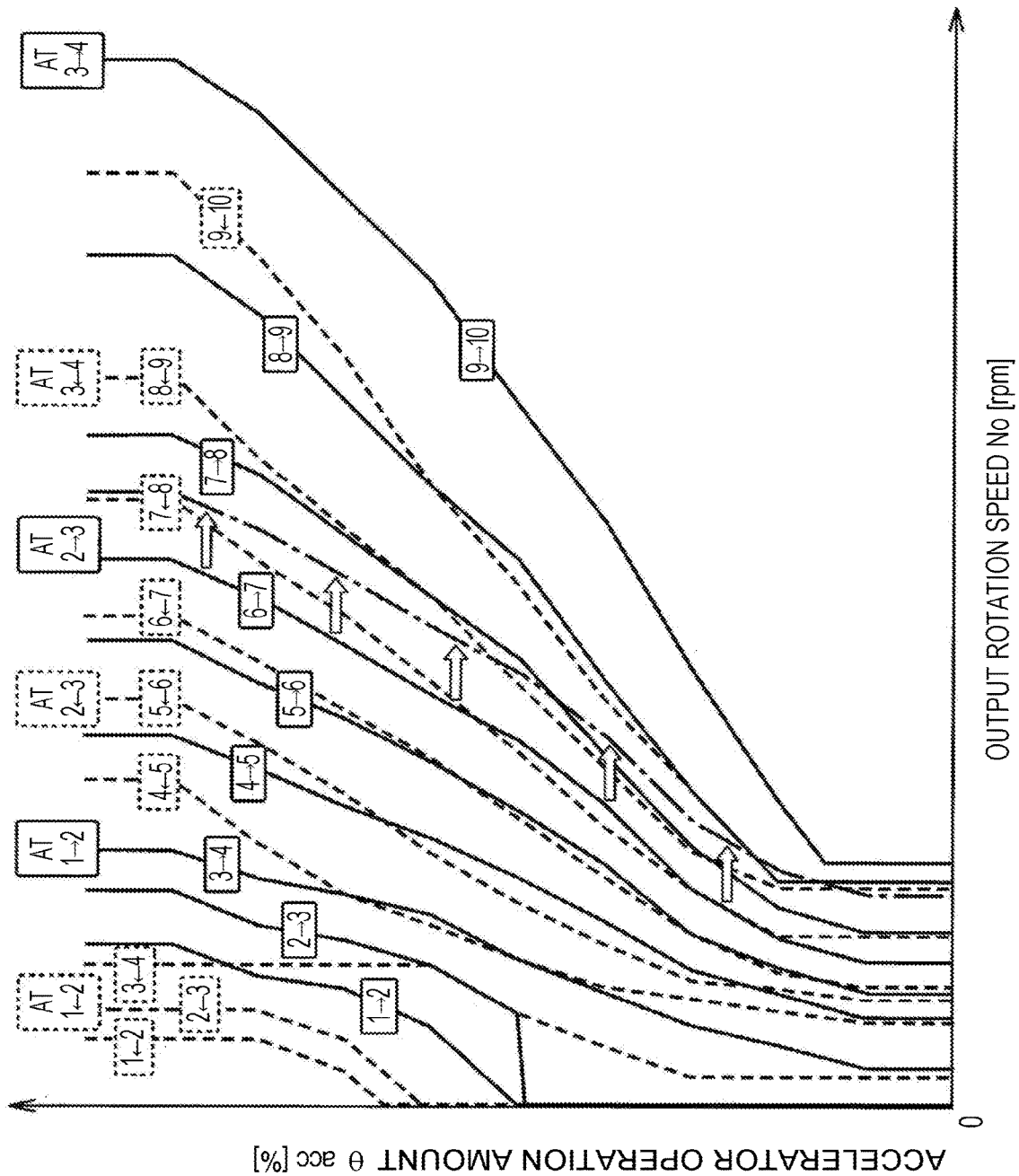
FIG. 8 is a diagram illustrating an example of a mock gear stage shifting map which is used for gear shifting control of a plurality of mock gear stages.

The mock gear stage shifting map is determined in advance using the output rotation speed No and the accelerator operation amount θacc as parameters similarly to the AT gear stage shifting map. FIG. 8 illustrates an example of the mock gear stage shifting map, where solid lines are upshift lines and dotted lines are downshift lines. By switching between the mock gear stage according to the mock gear stage shifting map, the same feeling of gear shifting as in a stepped transmission is obtained in the composite transmission 80 in which the stepless transmission 58 and the stepped transmission 60 are arranged in series as a whole. In mock stepped gear shifting control in which the composite transmission 80 as a whole performs gear shifting like a stepped transmission, the mock stepped gear shifting control has only to be performed in preference to stepless gear shifting control in which the composite transmission 80 as a whole operates as a stepless transmission, for example, when a travel mode in which travel performance has priority such as a sports travel mode is selected by a driver or when the required drive torque Twdem is relatively great, but the mock stepped gear shifting control may be basically performed except for a predetermined execution limiting time.

The mock stepped gear shifting control by the hybrid control unit 104 and the gear shifting control of the stepped transmission 60 by the AT gear shifting control unit 102 are performed in cooperation. In the first embodiment, ten types of mock gear stages including the first mock gear stage to the tenth mock gear stage are allocated to four types of AT gear stages including the first AT gear stage to the fourth AT gear stage. Accordingly, the AT gear stage shifting map is determined such that gear shifting of an AT gear stage is performed at the same time as gear shifting of the mock gear stages. Specifically, the upshift lines "3→4", "6→7", and "9→10" of the mock gear stages in FIG. 8 match the upshift lines "1→2", "2→3", and "3→4" in the AT gear stage shifting map (see "AT 1→2" and the like in FIG. 8). The upshift lines "2→3", "5→6", and "8→9" of the mock gear stages in FIG. 8 match the downshift lines "1←2", "2←3", and "3←4" in the AT gear stage shifting map (see "AT 1←2" and the like in FIG. 8). Alternatively, a gear shifting command for the AT gear stages may be output to the AT gear shifting control unit 102 based on a result of determination of gear shifting of a mock gear stage using the mock gear stage shifting map illustrated in FIG. 8. In this way, upshift of the composite transmission 80 as a whole is performed at the time of upshift of the stepped transmission 60, and downshift of the composite transmission 80 as a whole is performed at the time of downshift of the stepped transmission 60. The AT gear shifting control unit 102 performs switching of the AT gear stage of the stepped transmission 60 whenever the mock gear stage is switched. Since gear shifting of an AT gear stage is performed at the same time as gear shifting of a mock gear stage, gear shifting of the stepped transmission 60 is performed with change of the engine rotation speed Ne and even a shock following the gear shifting of the stepped transmission 60 is less likely to give discomfort to a driver.

The hybrid control unit 104 selectively forms the motor-driven travel mode or the hybrid travel mode as a travel mode depending on travel conditions and causes the vehicle 10 to travel in each travel mode. For example, the hybrid control unit 104 forms the motor-driven travel mode in a motor-driven travel area in which the required drive power Pwdem is less than predetermined threshold value, and forms the hybrid travel mode in a hybrid travel area in which the required drive power Pwdem is equal to or greater than the predetermined threshold value. Although the required drive power Pwdem is in the motor-driven travel area, the hybrid control unit 104 sets the hybrid travel mode when the SOC value SOC of the battery 54 is less than a predetermined engine-start threshold value, when warm-up of the engine 12 is necessary, or the like. The engine-start threshold value is a predetermined threshold value for determining whether the SOC value is a value at which the engine 12 needs to be forcibly started to charge the battery 54.

Figure 9:
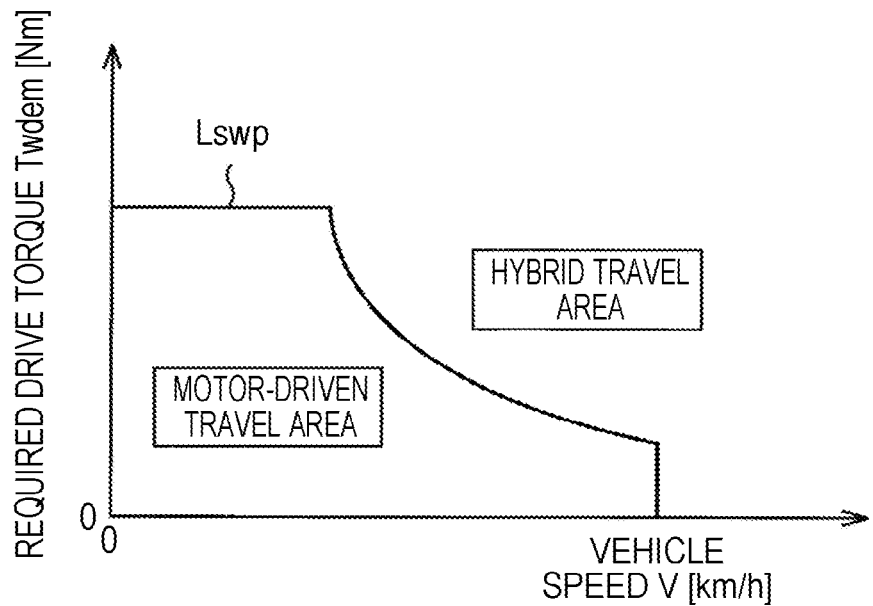
FIG. 9 is a diagram illustrating an example of a power source switching map which is used for switching control of motor-driven travel and hybrid travel of the vehicle.

FIG. 9 is a diagram illustrating an example of a power source switching map which is used for switching control between motor-driven travel and hybrid travel. In FIG. 9, a solid line Lswp is a boundary line between the motor-driven travel area and the hybrid travel area at which switching between the motor-driven travel area and the hybrid travel is performed. An area in which the vehicle speed V is relatively low, the required drive torque Twdem is relatively small, and the required drive power Pwdem is relatively small is defined in advance in the motor-driven travel area. An area in which the vehicle speed V is relatively high, the required drive torque Twdem is relatively great, and the required drive power Pwdem is relatively great is defined in advance in the hybrid travel area. When the SOC value SOC of the battery 54 is less than the engine-start threshold value or when warm-up of the engine 12 is necessary, the motor-driven travel area in FIG. 9 may be changed to the hybrid travel area.

When the motor-driven travel mode is set up and the required drive power Pwdem can be realized by only the second rotary machine MG2, the hybrid control unit 104 causes the vehicle 10 to travel in a single-motor-driven travel manner using the second rotary machine MG2. On the other hand, when the motor-driven travel mode is set up and the required drive power Pwdem cannot be realized by only the second rotary machine MG2, the hybrid control unit 104 causes the vehicle 10 to travel in a two-motor-driven travel manner. Although the required drive power Pwdem can be realized by only the second rotary machine MG2, the hybrid control unit 104 may cause the vehicle 10 to travel in the two-motor-driven travel manner when use of both the first rotary machine MG1 and the second rotary machine MG2 is more efficient than use of only the second rotary machine MG2.

When the hybrid travel mode is set up at the time of stopping of the engine 12, the hybrid control unit 104 performs start control for starting the engine 12. When starting of the engine 12 is performed, the hybrid control unit 104 starts the engine 12, for example, by performing ignition when the engine rotation speed Ne is equal to or higher than a predetermined rotation speed at which ignition is possible while increasing the engine rotation speed Ne using the first rotary machine MG1. That is, the hybrid control unit 104 starts the engine 12 by cranking the engine 12 using the first rotary machine MG1.

The hybrid control unit 104 sets a target deceleration based on a driver's operation of an accelerator (for example, an accelerator operation amount θacc or a rate of decrease of the accelerator operation amount θacc), a vehicle speed V, a gradient of a downhill road, a driver's operation of a brake for operating a wheel brake (for example, a brake operation amount or a brake operation rate), and the like. The hybrid control unit 104 generates a brake torque of the vehicle 10 such that the set target deceleration is realized. The brake torque of the vehicle 10 is generated, for example, by a regenerative torque from the second rotary machine MG2, a wheel brake torque from a wheel brake device which is not illustrated, an engine brake torque from the engine 12, and the like. The brake torque of the vehicle 10 is preferentially generated by the regenerative torque from the second rotary machine MG2, for example, from the viewpoint of improvement in fuel efficiency. When the regenerative torque from the second rotary machine MG2 is limited due to a high SOC value SOC of the battery 54 or the like and/or a great target deceleration is set, the brake torque of the vehicle 10 is generated by the wheel brake torque and/or the engine brake torque instead of the regenerative torque or in addition to the regenerative torque. When the engine brake torque is generated during motor-driven travel, the hybrid control unit 104 generates a desired engine brake torque based on the engine rotation speed Ne by increasing the engine rotation speed Ne using the first rotary machine MG1 in a state in which the engine 12 is stopped.

When the supercharger 18 is out of order and thus the operation of the supercharger 18 is limited, the engine torque Te is limited. Accordingly, the engine torque Te becomes insufficient and thus a decrease in a drive torque Tw with respect to the required drive torque Twdem for the vehicle 10 is caused. In order to curb such a decrease in the drive torque Tw, the electronic control unit 100 functionally includes a torque compensation unit 106 that compensates for a torque shortage of the engine 12 due to limitation of the operation of the supercharger 18 by the MG2 torque Tm of the second rotary machine MG2 when the operation of the supercharger 18 is limited. The electronic control unit 100 also functionally includes a state determining unit 108 that determines whether the operation of the supercharger 18 is limited.

The state determining unit 108 determines whether the operation of the supercharger 18 is limited. The state determining unit 108 determines that the operation of the supercharger 18 is limited, for example, when a mechanical malfunction of the supercharger 18 such as a malfunction of the waste gate valve 30 of the supercharger 18 is detected. When occurrence of knocking of the engine 12 is detected by a knocking sensor 89 and the supercharging pressure Pchg of the supercharger 18 is limited to curb the occurrence of knocking, the state determining unit 108 determines that the operation of the supercharger 18 is limited. When an exhaust air temperature THairout corresponding to the temperature of the catalyst converter 31 is higher than a limitation threshold value at which the operation of the supercharger 18 is limited, the state determining unit 108 determines that the operation of the supercharger 18 is limited. When the supercharger 18 malfunctions mechanically, the operation of the supercharger 18 is stopped, but when the operation of the supercharger 18 is limited due to occurrence of knocking or an increase in temperature of the catalyst converter 31, the upper limit of the supercharging pressure Pchg of the supercharger 18 may be set to be lower than that in a normal state without completely stopping the operation of the supercharger 18. The limitation of the operation of the supercharger 18 includes these cases.

The state determining unit 108 determines continuity of a state in which the operation of the supercharger 18 is limited. Continuity of the state in which the operation of the supercharger 18 is limited corresponds to a degree of extension of the state in which the operation of the supercharger 18 is limited. For example, when a mechanical malfunction such as a malfunction of the waste gate valve 30 of the supercharger 18 occurs, there is no possibility that the supercharger 18 will return to a normal state and thus it is determined that the continuity of the state in which the operation of the supercharger 18 is limited is high (high continuity). When knocking of the engine 12 occurs, the operation of the supercharger 18 is temporarily limited and thus it is determined that the continuity of the state in which the operation of the supercharger 18 is limited is low (low continuity). When the temperature of the catalyst converter 31 increases to be high, the operation of the supercharger 18 is unlimited with a decrease in the temperature and thus it is determined that the continuity of the state in which the operation of the supercharger 18 is limited is higher than that when knocking occurs and is lower than that when a mechanical malfunction occurs in the supercharger 18 (medium continuity).

The state determining unit 108 determines the continuity of the state in which the operation of the supercharger 18 is limited according to the above-mentioned reasons for the operation of the supercharger 18 being limited. That is, the state determining unit 108 determines that the continuity is low when occurrence of knocking is the reason for the operation of the supercharger 18 being limited, determines that the continuity is medium when the increase in temperature of the catalyst converter 31 is the reason for the operation of the supercharger 18 being limited, and determines that the continuity is high when the mechanical malfunction of the supercharger 18 is the reason for the operation of the supercharger 18 being limited.

The torque compensation unit 106 compensates for a torque shortage of the engine 12 due to limitation of the operation of the supercharger 18 by the MG2 torque Tm of the second rotary machine MG2 when it is determined that the operation of the supercharger 18 is limited. The torque compensation unit 106 calculates an engine torque Te based on the supercharging pressure Pchg, the accelerator operation amount θacc, the engine rotation speed Ne, and the like in the state in which the operation of the supercharger 18 is limited, and calculates a torque shortage Teloss (=Tetgt−Te) of the engine torque Te from the difference between the target engine torque Tetgt and the calculated engine torque Te. The torque compensation unit 106 calculates the MG2 torque Tm of the second rotary machine MG2 that can compensate for a torque shortage of the drive torque Tw of the vehicle 10 due to the torque shortage Teloss of the engine torque Te, and outputs the calculated MG2 torque Tm from the second rotary machine MG2. Accordingly, even when a torque shortage of the engine 12 due to limitation of the operation of the supercharger 18 occurs, the torque shortage is compensated for (is subjected to torque assist) by the MG2 torque Tm of the second rotary machine MG2 and thus a decrease in the drive torque Tw of the vehicle 10 is curbed.

Here, when the operation of the supercharger 18 is limited and the torque compensation unit 106 performs torque compensation using the MG2 torque Tm of the second rotary machine MG2, electric power which is consumed in the second rotary machine MG2 increases. Accordingly, when the number of times torque compensation is performed by the torque compensation unit 106 increases, the state of charge value SOC corresponding to an amount of electric power stored (a state of charge) in the battery 54 decreases. In this regard, the dischargeable power Wout is limited due to the decrease in the state of charge value SOC and there is a likelihood that the MG2 torque Tm for compensating for the torque shortage Teloss of the engine torque Te will not be able to be output from the second rotary machine MG2.

On the other hand, the electronic control unit 100 functionally includes a stored electric power decrease curbing unit 110 that prevents torque compensation from not being performed by the second rotary machine MG2. The stored electric power decrease curbing unit 110 performs stored electric power decrease curbing control for curbing a decrease in the state of charge value SOC corresponding to the amount of electric power stored in the battery 54 more when it is determined that the operation of the supercharger 18 is limited than when it is determined that the operation of the supercharger 18 is not limited.

The stored electric power decrease curbing unit 110 shifts a gear shifting line for determining gear shifting of the stepped transmission 60 to a higher-speed side when it is determined that the operation of the supercharger 18 is limited than when it is determined that the operation of the supercharger 18 is not limited. When it is determined that the operation of the supercharger 18 is limited, for example, upshift lines and downshift lines for determining gear shifting are shifted to a high-speed side in the mock gear stage shift map illustrated in FIG. 8. That is, when the operation of the supercharger 18 is limited, the upshift lines and the downshift lines illustrated in FIG. 8 are shifted to the right in FIG. 8 (a high-rotation side or a high-speed side of the output rotation speed No).

The upshift line "2→3" in FIG. 8 will be described below as an example. When it is determined that the operation of the supercharger 18 is limited, the upshift line "2→3" when it is determined that the operation of the supercharger 18 is not limited is shifted to a position indicated by an alternate long and short dash line. In this way, when the upshift lines and the downshift lines for determining gear shifting of the stepped transmission 60 are shifted to a high-speed side, the number of gear shifts of the stepped transmission 60 during travel decreases. Accordingly, since power consumption due to gear shifting of the stepped transmission 60 is curbed, it is possible to curb a decrease in the state of charge value SOC of the battery 54.

The stored electric power decrease curbing unit 110 sets an amount of shift of the upshift lines and the downshift lines for determining gear shifting of the stepped transmission 60 to a high-speed side to be greater when it is determined that the continuity of the state in which the operation of the supercharger 18 is limited is high than when it is determined that the continuity of the state in which the operation of the supercharger 18 is limited is low. Here, the case in which it is determined that the continuity of the state in which the operation of the supercharger 18 is limited is high corresponds to a case in which it is determined that the state in which the operation of the supercharger 18 is limited will last a long time. At this time, since torque compensation using the second rotary machine MG2 is performed more often by the torque compensation unit 106, the state of charge value SOC of the battery 54 is likely to decrease. On the other hand, the case in which it is determined that the continuity of the state in which the operation of the supercharger 18 is limited is low corresponds to a case in which the state in which the operation of the supercharger 18 is limited will last a short time. At this time, since torque compensation using the second rotary machine MG2 is performed less often by the torque compensation unit 106, the state of charge value SOC of the battery 54 is less likely to decrease in comparison with a case in which the continuity of the state in which the operation of the supercharger 18 is limited is high.

Figure 10:
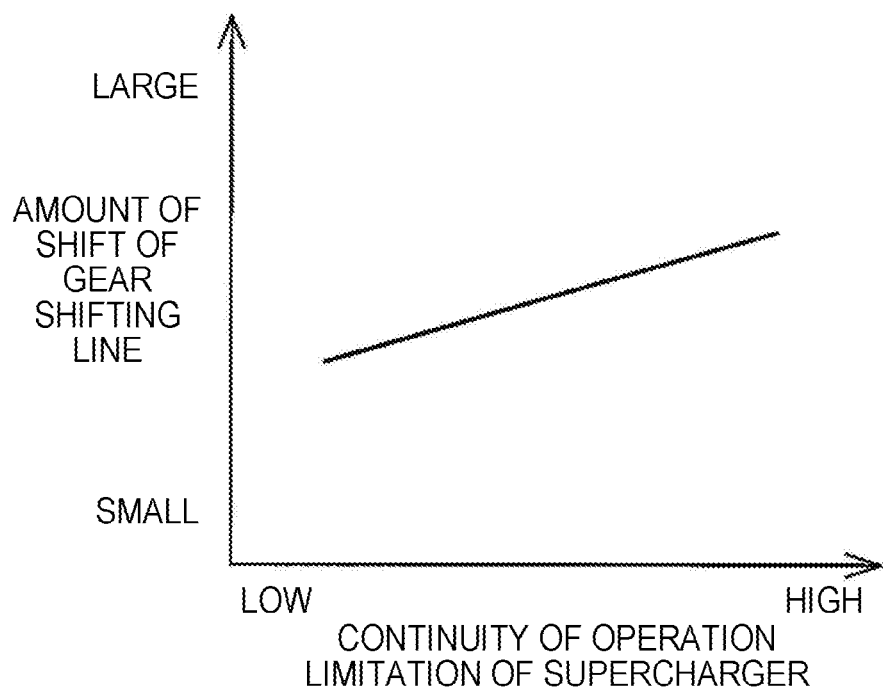
FIG. 10 is a diagram illustrating a relationship between continuity of operation limitation of a supercharger which is mounted in the engine and an amount of shift of a gear shifting line of an automatic transmission.

FIG. 10 is a diagram illustrating a relationship between continuity of operation limitation of the supercharger 18 and an amount of shift of the gear shifting line of the stepped transmission 60. As illustrated in FIG. 10, when the continuity of operation limitation of the supercharger 18 increases, an amount of shift of the gear shifting line of the stepped transmission 60 to a high-speed side increases in comparison with a case in which the continuity of operation limitation of the supercharger 18 is low. When the continuity of operation limitation of the supercharger 18 increases, torque compensation using the MG2 torque Tm of the second rotary machine MG2 is performed more often by the torque compensation unit 106 and thus the state of charge value SOC of the battery 54 is likely to decrease. On the other hand, as illustrated in FIG. 10, since the gear shifting line of the stepped transmission 60 is shifted to a higher-speed side as the continuity of operation limitation of the supercharger 18 becomes higher, the number of gear shifts of the stepped transmission 60 decreases and power consumption due to gear shifting of the stepped transmission 60 is curbed more as the continuity of operation limitation of the supercharger 18 increases.

The stored electric power decrease curbing unit 110 determines an amount of shift of the gear shifting line of the stepped transmission 60 by applying the continuity of operation limitation of the supercharger 18 determined by the state determining unit 108 to the relationship illustrated in FIG. 10, and shifts the gear shifting line to a high-speed side based on the determined amount of shift. The AT gear shifting control unit 102 performs determination of gear shifting and performs gear shifting based on the gear shifting line of the stepped transmission 60 set by the stored electric power decrease curbing unit 110. As a result, when the continuity of operation limitation of the supercharger 18 increases, the amount of shift of the gear shifting line to a high-speed side increases in comparison with a case in which the continuity of operation limitation of the supercharger 18 is low. Accordingly, the number of gear shifts of the stepped transmission 60 decreases and power consumption due to gear shifting of the stepped transmission 60 is curbed.

The stored electric power decrease curbing unit 110 sets the MG2 torque Tm which is a regenerative torque of the second rotary machine MG2 at the time of deceleration (regeneration) of the vehicle to be greater when it is determined that the operation of the supercharger 18 is limited than when it is determined that the operation of the supercharger 18 is not limited. By increasing the MG2 torque Tm of the second rotary machine MG2 (the regenerative torque) at the time of deceleration of the vehicle, it is possible to increase an amount of electric power generated at the time of regeneration of the second rotary machine MG2. Accordingly, since an amount of electric power charged in the battery 54 at the time of deceleration of the vehicle is set to be greater when it is determined that the operation of the supercharger 18 is limited than when it is determined that the operation of the supercharger 18 is not limited, it is possible to curb a decrease in the state of charge value SOC of the battery 54. At this time, the deceleration of the vehicle 10 increases with an increase in the MG2 torque Tm of the second rotary machine MG2 in comparison with a normal case. Alternatively, control may be performed such that an influence of the increase in the MG2 torque Tm of the second rotary machine MG2 is cancelled by decreasing a braking force of a wheel brake which is not illustrated with an increase in the MG2 torque Tm of the second rotary machine MG2.

When the MG2 torque Tm of the second rotary machine MG2 is increased, the stored electric power decrease curbing unit 110 sets an amount of increase in the MG2 torque Tm at the time of regeneration of the second rotary machine MG2 to be greater when it is determined that the continuity of operation limitation of the supercharger 18 is high (that is, when it is determined that the state in which the operation of the supercharger 18 is limited is long) than when it is determined that the continuity of operation limitation of the supercharger 18 is low (that is, when it is determined that the state in which the operation of the supercharger 18 is limited is short).

Figure 11:
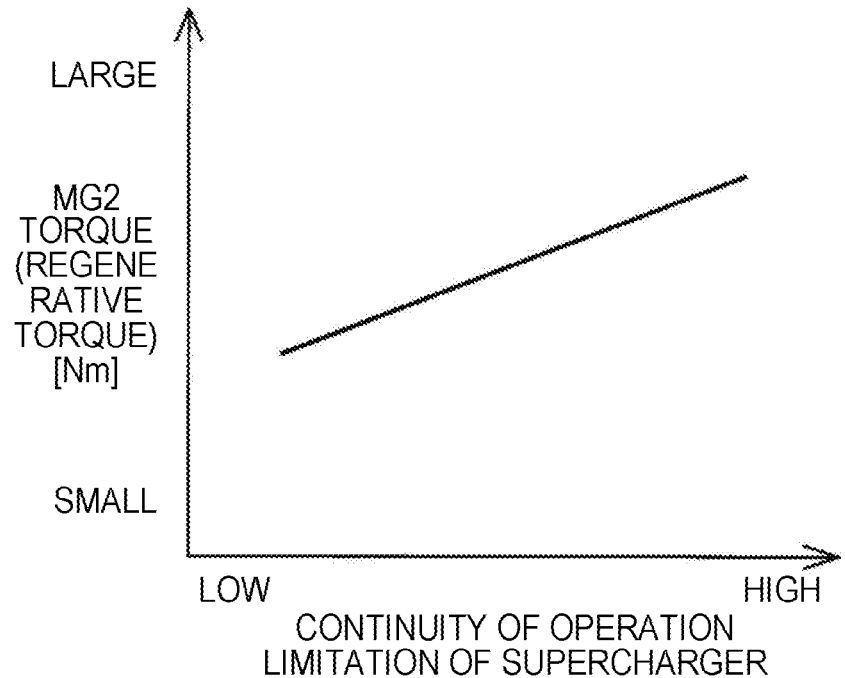
FIG. 11 is a diagram illustrating a relationship between continuity of operation limitation of the supercharger and a regenerative torque of a second rotary machine.

FIG. 11 illustrates a relationship between the continuity of operation limitation of the supercharger 18 and the MG2 torque Tm of the second rotary machine MG2 (a regenerative torque). As illustrated in FIG. 11, when the continuity of operation limitation of the supercharger 18 is high, the MG2 torque Tm of the second rotary machine MG2 is set to be greater than when the continuity of operation limitation of the supercharger 18 is low. The stored electric power decrease curbing unit 110 determines the MG2 torque Tm of the second rotary machine MG2 at the time of deceleration of the vehicle by applying the continuity of operation limitation of the supercharger 18 determined by the state determining unit 108 to the relationship illustrated in FIG. 11. The hybrid control unit 104 sets the MG2 torque Tm of the second rotary machine MG2 at the time of deceleration of the vehicle to the MG2 torque Tm determined by the stored electric power decrease curbing unit 110, whereby the MG2 torque Tm of the second rotary machine MG2 increases according to the continuity of operation limitation of the supercharger 18. As a result, since the amount of electric power charged in the battery 54 at the time of deceleration of the vehicle becomes greater when the continuity of operation limitation of the supercharger 18 is high than when the continuity of operation limitation of the supercharger 18 is low, it is possible to curb a decrease in the state of charge value SOC of the battery 54.

Here, when the stored electric power decrease curbing unit 110 increases the MG2 torque Tm of the second rotary machine MG2 at the time of deceleration of the vehicle while the vehicle is traveling on a road on which the driving wheels are likely to slip such as a low-μ road, the driving wheels may be more likely to slip and travel stability may decrease. Accordingly, the stored electric power decrease curbing unit 110 determines whether a road on which the vehicle is traveling is a slippery road (a low-μ road) when increasing the MG2 torque Tm of the second rotary machine MG2 at the time of deceleration of the vehicle, and prohibits an increase in the MG2 torque Tm of the second rotary machine MG2 when the road on which the vehicle is traveling is a slippery road. Whether the road on which the vehicle is traveling is a slippery road is determined, for example, based on road information stored in a car navigation system or the like. Alternatively, when slippage of the driving wheels is detected based on rotation speeds of the wheels during travel, it may be determined that the road on which the vehicle is traveling is a slippery road.

The stored electric power decrease curbing unit 110 sets a target value SOCaim of the state of charge value SOC to be greater when it is determined that the operation of the supercharger 18 is limited than when it is determined that the operation of the supercharger 18 is not limited. In this regard, the hybrid control unit 104 performs hybrid travel to reach the target value SOCaim of the state of charge value SOC set by the stored electric power decrease curbing unit 110. Accordingly, the engine torque Te during hybrid travel becomes greater and the MG1 torque Tg of the first rotary machine MG1 (a regenerative torque) becomes greater when it is determined that the operation of the supercharger 18 is limited more than when it is determined that the operation of the supercharger 18 is not limited. On the other hand, since the MG2 torque Tm of the second rotary machine MG2 (a powering torque) becomes less and thus the state of charge value SOC of the battery 54 becomes greater, it is possible to curb a decrease in the state of charge value SOC of the battery 54.

The stored electric power decrease curbing unit 110 sets an amount of increase in the target value SOCaim of the state of charge value SOC to be greater when it is determined that the continuity of operation limitation of the supercharger 18 is high (that is, when it is determined that the state in which the operation of the supercharger 18 is limited is long) than when it is determined that the continuity of operation limitation of the supercharger 18 is low (that is, when it is determined that the state in which the operation of the supercharger 18 is limited is short).

Figure 12:
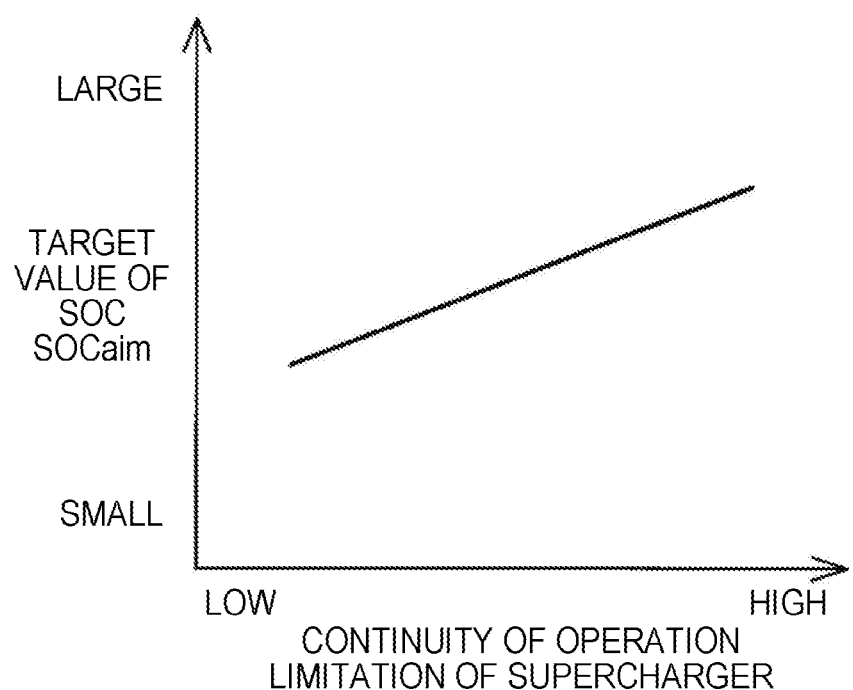
FIG. 12 is a diagram illustrating a relationship between continuity of operation limitation of the supercharger and a target value of a state of charge value.

FIG. 12 illustrates a relationship between the continuity of operation limitation of the supercharger 18 and the target value SOCaim of the state of charge value SOC. As illustrated in FIG. 12, the target value SOCaim of the state of charge value SOC is set to be greater when the continuity of operation limitation of the supercharger 18 is high than when the continuity of operation limitation of the supercharger 18 is low. The stored electric power decrease curbing unit 110 sets the target value SOCaim of the state of charge value SOC by applying the continuity of operation limitation of the supercharger 18 determined by the state determining unit 108 to the relationship illustrated in FIG. 12. The hybrid control unit 104 performs hybrid travel to reach the target value SOCaim of the state of charge value SOC set by the stored electric power decrease curbing unit 110. As a result, as the continuity of operation limitation of the supercharger 18 becomes higher, the state of charge value SOC of the battery 54 becomes greater.

The stored electric power decrease curbing unit 110 limits motor-driven travel using only a rotary machine MG (at least one of the first rotary machine MG1 and the second rotary machine MG2) as a drive power source for travel more when it is determined that the operation of the supercharger 18 is limited than when it is determined that the operation of the supercharger 18 is not limited. Specifically, when it is determined that the operation of the supercharger 18 is limited, the stored electric power decrease curbing unit 110 prohibits motor-driven travel or narrows the motor-driven travel area illustrated in FIG. 9 more than when it is determined that the operation of the supercharger 18 is not limited. In this regard, the hybrid control unit 104 performs hybrid travel in the motor-driven travel area or switches the travel mode based on the drive power source switching map in which the motor-driven travel area has been narrowed. As a result, since hybrid travel is performed a greater number of times when it is determined that the operation of the supercharger 18 is limited than when it is determined that the operation of the supercharger 18 is not limited, it is possible to curb a decrease in the state of charge value SOC of the battery 54.

The stored electric power decrease curbing unit 110 sets an amount of limitation of motor-driven travel using only the rotary machine MG as a drive power source for travel to be greater when it is determined that the continuity of operation limitation of the supercharger 18 is high (that is, when it is determined that the state in which the operation of the supercharger 18 is limited is long) than when it is determined that the continuity of operation limitation of the supercharger 18 is low (that is, when it is determined that the state in which the operation of the supercharger 18 is limited is short).

Figure 13:
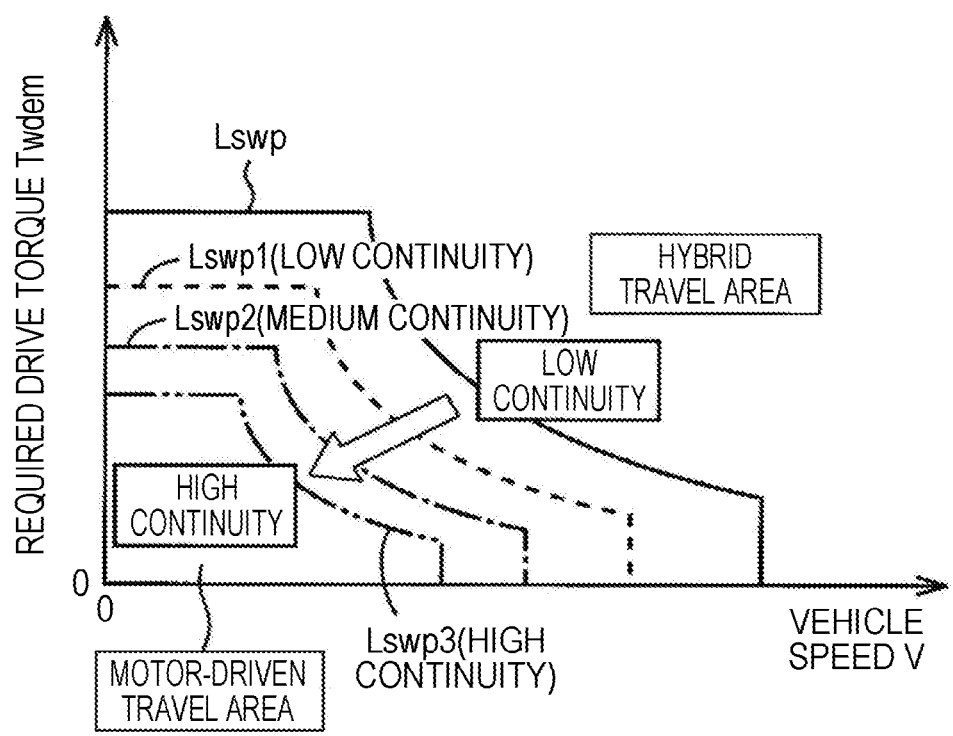
FIG. 13 is a drive power source switching map which is used when it is determined that operation of the supercharger is limited.

FIG. 13 illustrates a drive power source switching map which is used when it is determined that the operation of the supercharger 18 is limited. In FIG. 13, a solid line Lswp is a boundary line between the motor-driven travel area and the hybrid travel area when the operation of the supercharger 18 is not limited. In FIG. 13, a dotted line Lswp1, an alternate long and short dash line Lswp2, and an alternate long and two short dashes line Lswp3 represent boundary lines between the motor-driven travel area and the hybrid travel area when the operation of the supercharger 18 is limited. Here, the dotted line Lswp1 corresponds to a case in which the continuity of operation limitation of the supercharger 18 is low (low continuity), the alternate long and short dash line Lswp2 corresponds to a case in which the continuity of operation limitation of the supercharger 18 is higher than the continuity corresponding to the dotted line Lswp1 (medium continuity), and the alternate long and two short dashes line Lswp3 corresponds to a case in which the continuity of operation limitation of the supercharger 18 is higher than the continuity corresponding to the alternate long and short dash line Lswp2 (high continuity). As illustrated in FIG. 13, the motor-driven travel area in which only a rotary machine MG is used as a drive power source for travel becomes narrower as the continuity of operation limitation of the supercharger 18 becomes high. That is, an amount of limitation of the motor-driven travel using only at least one of the first rotary machine MG1 and the second rotary machine MG2 as a drive power source for travel increases as the continuity of operation limitation of the supercharger 18 increases.

The stored electric power decrease curbing unit 110 sets a new drive power source switching map based on the continuity of operation limitation of the supercharger 18 by applying the continuity of operation limitation of the supercharger 18 determined by the state determining unit 108 to the drive power source switching map illustrated in FIG. 13. The hybrid control unit 104 switches the drive power source for travel based on the drive power source switching map newly set by the stored electric power decrease curbing unit 110. As a result, since the motor-driven travel area is narrowed more as the continuity of operation limitation of the supercharger 18 becomes higher, the number of times motor-driven travel is performed decreases, power consumption due to the motor-driven travel is curbed, and the decrease in the state of charge value SOC of the battery 54 is curbed.

Figure 14:
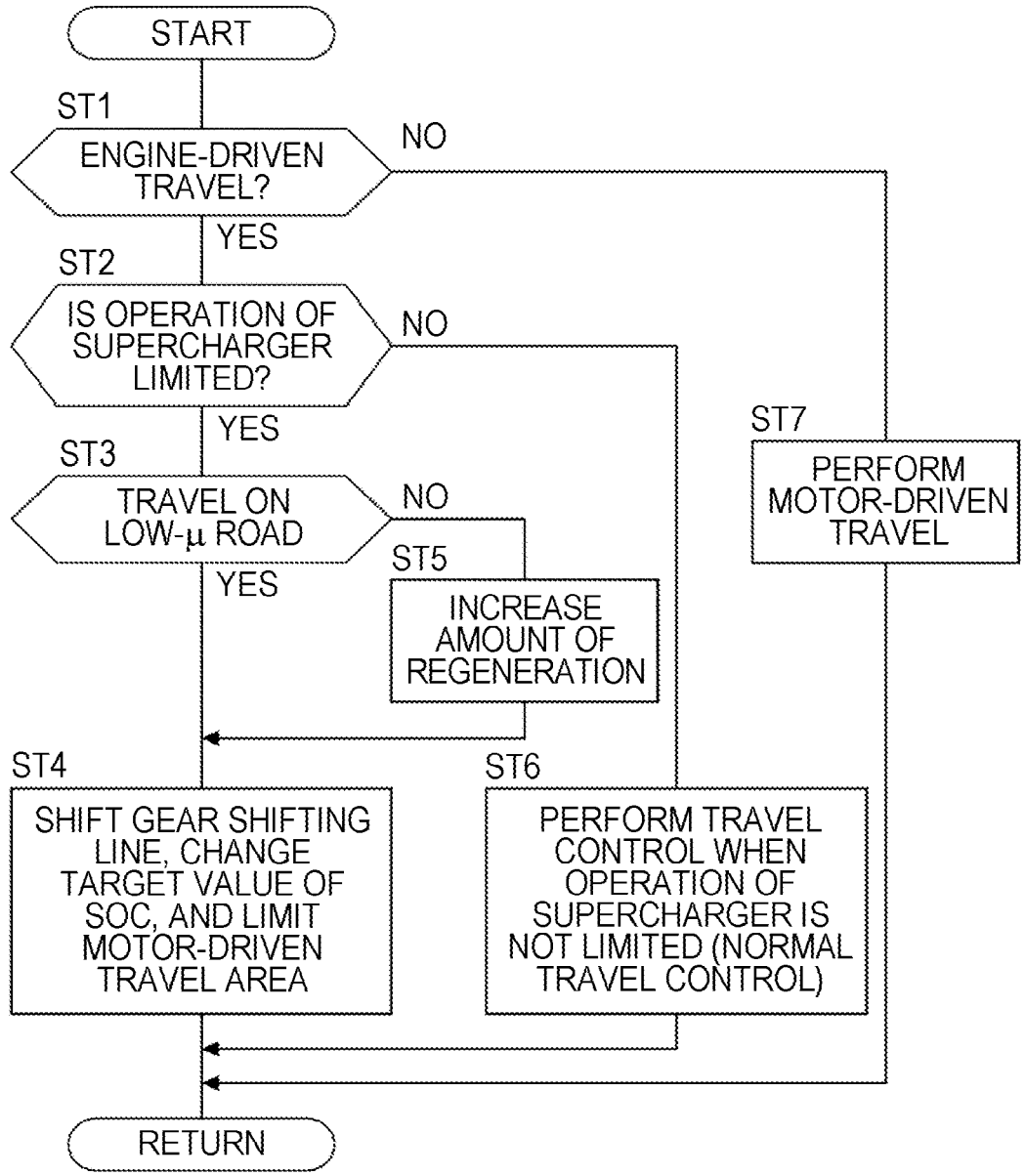
FIG. 14 is a flowchart illustrating an example of a principal part of a control operation of an electronic control unit which is provided in a controller for a vehicle, that is, a control operation of stably performing torque assist with a torque of a second rotary machine when operation of the supercharger is limited.

FIG. 14 is a flowchart illustrating a principal part of a control operation in the electronic control unit 100, that is, a control operation for stably performing torque compensation using the MG2 torque Tm of the second rotary machine MG2 when the operation of the supercharger 18 is limited. This flowchart is repeatedly performed while the vehicle is traveling.

First, in Step ST1 (the word "step" is omitted below) corresponding to the control function of the hybrid control unit 104, it is determined whether engine-driven travel (hybrid travel) with the engine 12 as one drive power source for travel is being performed. When the determination result of ST1 is negative, motor-driven travel with at least one of the first rotary machine MG1 and the second rotary machine MG2 as a drive power source for travel is performed in ST7 corresponding to the control function of the hybrid control unit 104. When the determination result of ST1 is positive, it is determined that the operation of the supercharger 18 is limited in ST2 corresponding to the control function of the state determining unit 108.

When the determination result of ST2 is negative, travel control when the operation of the supercharger 18 is not limited (normal travel control) is performed in ST6 corresponding to the control function of the hybrid control unit 104. When the determination result of ST2 is positive, it is determined whether the vehicle is traveling on a slippery road (a low-μ road) in ST3 corresponding to the control function of the stored electric power decrease curbing unit 110. When the determination result of ST3 is negative, the MG2 torque Tm which is a regenerative torque of the second rotary machine MG2 at the time of deceleration of the vehicle increases according to the continuity of operation limitation of the supercharger 18 in ST5 corresponding to the control function of the stored electric power decrease curbing unit 110. Accordingly, since an amount of regeneration in the second rotary machine MG2 at the time of deceleration of the vehicle increases, it is possible to curb a decrease in the state of charge value SOC of the battery 54.

Subsequently, in ST4 corresponding to the control function of the stored electric power decrease curbing unit 110, the gear shifting line for determining gear shifting of the stepped transmission 60 is shifted to a high-speed side according to the continuity of operation limitation of the supercharger 18. The target value SOCaim of the state of charge value SOC of the battery 54 is changed according to the continuity of operation limitation of the supercharger 18. The travel area of motor-driven travel with at least one of the first rotary machine MG1 and the second rotary machine MG2 as a drive power source for travel is limited according to the continuity of operation limitation of the supercharger 18. By performing this control, it is possible to curb a decrease in the state of charge value SOC of the battery 54. As a result, when torque compensation is performed using the MG2 torque Tm of the second rotary machine MG2 in a state in which the operation of the supercharger 18 is limited, the state of charge value SOC of the battery 54 is maintained such that torque compensation using the second rotary machine MG2 can be performed and thus it is possible to prevent torque compensation using the second rotary machine MG2 from not being performed due to the decrease in the state of charge value SOC.

According to the first embodiment described above, in the configuration in which a torque shortage of the engine 12 due to limitation of the operation of the supercharger 18 is compensated for by the MG2 torque Tm of the second rotary machine MG2 when it is determined that the operation of the supercharger 18 is limited, a decrease in the state of charge value SOC of the battery 54 is curbed more when it is determined that the operation of the supercharger 18 is limited than when it is determined that the operation of the supercharger 18 is not limited. Accordingly, it is possible to prevent the torque shortage of the engine 12 from not being compensated for by the MG2 torque Tm of the second rotary machine MG2 due to a decrease in the state of charge value SOC of the battery 54 device during travel.

According to the first embodiment, since the gear shifting line of the stepped transmission 60 is shifted to a higher-speed side when it is determined that the operation of the supercharger 18 is limited than when it is determined that the operation of the supercharger 18 is not limited, the number of gear shifts of the stepped transmission 60 decreases. Accordingly, it is possible to curb power consumption due to gear shifting of the stepped transmission 60 and thus to curb a decrease in the state of charge value SOC of the battery 54. Since the amount of shift of the gear shifting line of the stepped transmission 60 becomes greater when it is determined that continuity of operation limitation of the supercharger 18 is high than when it is determined that the continuity of operation limitation of the supercharger 18 is low, the number of gear shifts of the stepped transmission 60 decreases and thus it is possible to curb power consumption due to gear shifting of the stepped transmission 60 and to curb a decrease in the state of charge value SOC of the battery 54.

According to the first embodiment, since the MG2 torque Tm (a regenerative torque) at the time of regeneration of the second rotary machine MG2 is greater when it is determined that the operation of the supercharger 18 is limited than when it is determined that the operation of the supercharger 18 is not limited, an amount of electric power charged in the battery 54 at the time of regeneration of the second rotary machine MG2 increases and thus it is possible to curb a decrease in the state of charge value SOC of the battery 54. Since the chargeable power at the time of regeneration of the second rotary machine MG2 becomes greater when it is determined that the continuity of operation limitation of the supercharger 18 is high than when it is determined that the continuity of operation limitation of the supercharger 18 is low, it is possible to curb a decrease in the state of charge value SOC of the battery 54.

According to the first embodiment, since motor-driven travel with only at least one of the first rotary machine MG1 and the second rotary machine MG2 as a drive power source for travel is limited more when it is determined that the operation of the supercharger 18 is limited than when it is determined that the operation of the supercharger 18 is not limited, it is possible to limit motor-driven travel to curb power consumption and thus to curb a decrease in the state of charge value SOC of the battery 54 when it is determined that the operation of the supercharger 18 is limited. Since motor-driven travel is limited more when it is determined that the continuity of operation limitation of the supercharger 18 is high than when it is determined that the continuity of operation limitation of the supercharger 18 is low, it is possible to curb power consumption due to motor-driven travel and to curb a decrease in the state of charge value SOC of the battery 54.

A second embodiment of the disclosure will be described below. In the following description, elements which are common to those in the first embodiment will be referred to by the same reference signs and description thereof will not be repeated.

Figure 15:
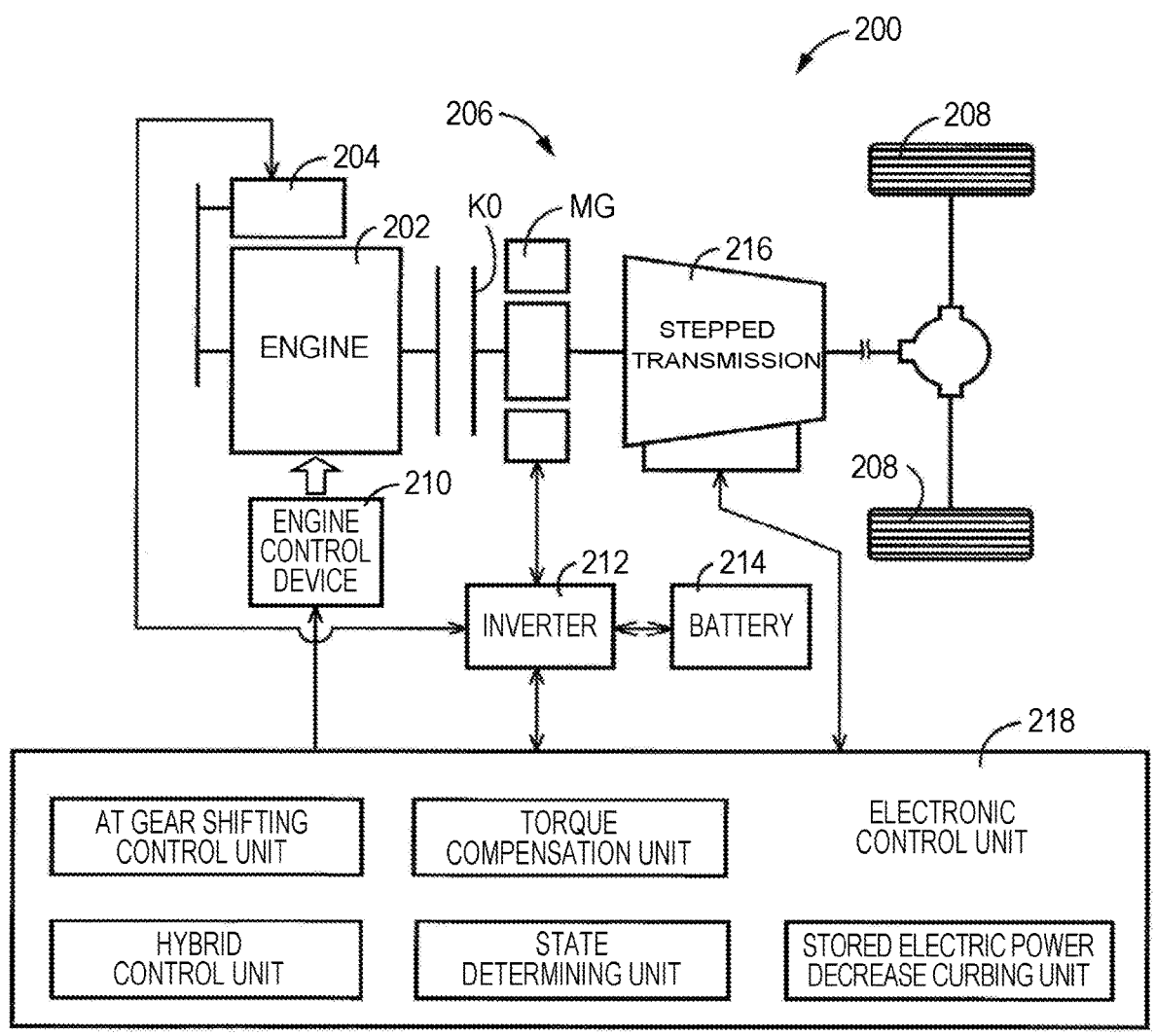
FIG. 15 is a diagram schematically illustrating a configuration of a vehicle to which a second embodiment of the disclosure is applied.

In the second embodiment, a vehicle 200 which is different from the vehicle 10 described in the first embodiment and which is illustrated in FIG. 15 is exemplified. FIG. 15 is a diagram schematically illustrating a configuration of the vehicle 200 to which the disclosure is applied. In FIG. 15, the vehicle 200 is a hybrid vehicle including an engine 202, an alternator 204, a rotary machine MG, a power transmission device 206, and driving wheels 208.

The engine 202 serving as a drive power source for travel has the same configuration as the engine 12 with the supercharger 18 described in the first embodiment. An engine torque Te of the engine 202 is controlled by causing an electronic control unit 218 which will be described later and which is provided in the vehicle 10 to control an engine control device 210 including a throttle actuator, a fuel injection device, an ignition device, and a waste gate valve which are provided in the vehicle 200.

The alternator 204 is a rotary electric machine having a function of a starter that cranks the engine 202 and a function of a power generator. The alternator 204 is a rotary machine which is mechanically connected to the engine 202 and to which power of the engine 202 is transmitted. The alternator 204 is rotationally driven by the engine 202 to generate electric power with power of the engine 202. The rotary machine MG is a rotary electric machine having a function of an electric motor and a function of a power generator and is called a motor generator. The rotary machine MG is a second rotary machine that is connected to the driving wheels 208 via the power transmission device 206 in a power-transmittable manner and that serves as a drive power source for travel. The alternator 204 and the rotary machine MG are connected to a battery 214 provided in the vehicle 200 via an inverter 212 provided in the vehicle 200. In the alternator 204 and the rotary machine MG, an alternator torque Talt which is an output torque of the alternator 204 and an MG torque Tmg which is an output torque of the rotary machine MG are controlled by causing the electronic control unit 218 to control the inverter 212. A generated electric power Walt of the alternator 204 is charged in the battery 214 which is a power storage device or is consumed in the rotary machine MG. The rotary machine MG outputs the MG torque Tmg using all or some of the generated electric power Walt or using electric power from the battery 214 in addition to the generated electric power Walt. In this way, the rotary machine MG is driven with the generated electric power Walt of the alternator 204.

The power transmission device 206 includes a clutch K0 and an automatic transmission 216. An input rotary member of the automatic transmission 216 is connected to the engine 202 via the clutch K0 and is directly connected to the rotary machine MG. In the power transmission device 206, power of the engine 202 is transmitted to the driving wheels 208 sequentially via the clutch K0, the automatic transmission 216, and the like and power of the rotary machine MG is transmitted to the driving wheels 208 via the automatic transmission 216 and the like. The engine 202 and the rotary machine MG are drive power sources for travel of the vehicle 200 that are connected to the driving wheels 208 in a power-transmittable manner.

The clutch K0 is a hydraulic frictional engagement device that connects or disconnects the power transmission path between the engine 202 and the driving wheels 208. The automatic transmission 216 is, for example, a known planetary gear type automatic transmission similarly to the stepped transmission 60 described above in the first embodiment.

The vehicle 200 can perform motor-driven travel in which electric power from the battery 214 is used and only the rotary machine MG is used as the drive power source for travel in a state in which the clutch K0 is disengaged and operation of the engine 202 is stopped. The vehicle 200 can perform hybrid travel in which the engine 202 operates in a state in which the clutch K0 is engaged and at least the engine 202 is used as the drive power source for travel.

The vehicle 200 includes an electronic control unit 218 which is a controller for the vehicle 200 associated with control of the engine 202, the alternator 204, the automatic transmission 216, the rotary machine MG, and the like. The electronic control unit 218 has the same configuration as the electronic control unit 100 described above in the first embodiment. The electronic control unit 218 is supplied with various signals which are the same as supplied to the electronic control unit 100. Various command signals which are the same as output from the electronic control unit 100 are output from the electronic control unit 218. The electronic control unit 218 has functions equivalent to the functions of the AT gear shifting control unit 102, the hybrid control unit 104, the torque compensation unit 106, the state determining unit 108, and the stored electric power decrease curbing unit 110 which are included in the electronic control unit 100. The electronic control unit 218 is an example of a controller in the disclosure.

The vehicle 200 illustrated in FIG. 15 can perform hybrid travel with the engine 202 as a drive power source for travel when the clutch K0 is engaged. At this time, when the operation of the supercharger 18 is limited in the vehicle 200, torque compensation for compensating for the torque shortage of the engine 12 by the MG torque Tmg of the rotary machine MG can also be performed. Similarly to the first embodiment, when it is determined that the operation of the supercharger 18 is limited, it is possible to curb a decrease in the state of charge value SOC of the battery 214 by shifting the gear shifting line of the stepped transmission 216 to a high-speed side, increasing the regenerative torque of the rotary machine MG at the time of deceleration of the vehicle, increasing the target value SOCaim of the state of charge value SOC of the battery 214, or narrowing a motor-driven travel area in which motor-driven travel is performed. Accordingly, with the vehicle 200, the same advantages as in the first embodiment can be achieved by performing the same control as in the first embodiment.

While the first embodiment and the second embodiment of the disclosure have been described above in detail with reference to the accompanying drawings, the disclosure can be applied to other aspects.

For example, in the first embodiment and the second embodiment, when it is determined that the operation of the supercharger 18 of the engine 12 or 202 is limited, motor-driven travel with only the rotary machine MG as a drive power source for travel is limited by shifting the gear shifting line of the stepped transmission 60 or 216 to a high-speed side, increasing the regenerative torque of the second rotary machine MG2 or the rotary machine MG, increasing the target value SOCaim of the state of charge value SOC of the battery 54 or 214, or narrowing the motor-driven travel area, but all thereof do not have to be performed. Specifically, at least one of various types of control for curbing a decrease in the state of charge value SOC may be performed.

In the first embodiment and the second embodiment, when it is determined that the operation of the supercharger 18 is limited, the gear shifting lines are shifted to a high-speed side by the same amount in all areas of the accelerator operation amount θacc as indicated by the alternate long and short dash line in FIG. 8, but the disclosure is not limited thereto. That is, the amount of shift to a high-speed side may differ appropriately depending on the accelerator operation amount θacc. The amount of shift of the gear shifting line may be appropriately changed depending on the number of gear stages, the upshift lines, the downshift lines, and the like.

In the first embodiment and the second embodiment, the vehicle 10 or 200 includes the stepped transmission 60 or 216, but the automatic transmission is not essential in the disclosure and a configuration not including an automatic transmission may be employed. In this case, control for shifting the gear shifting line of the stepped transmission 60 or 216 to a high-speed side to curb a decrease in the state of charge value SOC of the battery 54 or 214 is not performed, and the decrease in the state of charge value SOC of the battery is curbed through other control.

In the first embodiment and the second embodiment, when the regenerative torque of the rotary machine (the second rotary machine MG2 or the rotary machine MG) is increased at the time of deceleration of the vehicle, it is determined whether the road on which the vehicle is traveling is a slippery road (a low-μ road), but this determination does not have to be performed and may be omitted.

In the first embodiment, the one-way clutch F0 is described as a lock mechanism that can fix the carrier CA0 in a non-rotatable manner, but the disclosure is not limited thereto. The lock mechanism may be an engagement device such as an engaging clutch, a hydraulic frictional engagement device such as a clutch or a brake, a dry engagement device, an electromagnetic frictional engagement device, or a magnetic powder type clutch, which selectively connects the connection shaft 68 and the case 56. Alternatively, the vehicle 10 does not have to include the one-way clutch F0.

In the first embodiment, the stepless transmission 58 may be a gear shifting mechanism in which a differential operation can be limited by controlling a clutch or brake connected to the rotary element of the differential mechanism 72. The differential mechanism 72 may be a double pinion type planetary gear mechanism. The differential mechanism 72 may be a differential mechanism including four or more rotary elements by connecting a plurality of planetary gear units. The differential mechanism 72 may be a differential gear mechanism in which the first rotary machine MG1 and the intermediate transmission member 70 are respectively connected to a pinion which is rotationally driven by the engine 12 and a pair of bevel gears engaging with the pinion. The differential mechanism 72 may be a mechanism having a configuration in which two or more planetary gear units are connected to each other by some rotary elements constituting them and the engine, the rotary machine, and the driving wheels are connected to the rotary elements of such planetary gear units in a power-transmittable manner.

In the first and second embodiments, the stepped transmissions 60 and 216 are exemplified above as the automatic transmission constituting a part of the power transmission path between the drive power source for travel and the driving wheels, but the disclosure is not limited to the aspect. For example, the automatic transmission may be an automatic transmission such as a synchromesh parallel biaxial automatic transmission, a known dual clutch transmission (DCT) with two input shafts as the synchromesh parallel biaxial automatic transmission, or a known mechanical stepless transmission such as a belt type stepless transmission.

In the first and second embodiments, a mechanical pump type supercharger that is rotationally driven by the engine or the electric motor may be provided in addition to the exhaust turbine type supercharger 18.

The above-mentioned embodiments are merely exemplary and the disclosure can be embodied in various forms which have been subjected to various modifications and improvements based on knowledge of those skilled in the art.

What is claimed is:

1. A controller for a hybrid vehicle, the hybrid vehicle including an engine with a supercharger serving as a drive power source for travel, a rotary machine serving as a drive power source for travel, and a power storage device configured to transmit and receive electric power to and from the rotary machine, the controller comprising:
   circuitry configured to determine whether an operation of the supercharger is limited;
   circuitry configured to compensate for a torque shortage of the engine due to limitation of the operation of the supercharger by a torque of the rotary machine when it is determined that the operation of the supercharger is limited; and
   circuitry configured to curb a decrease in an amount of electric power stored in the power storage device more when it is determined that the operation of the supercharger is limited than when it is determined that the operation of the supercharger is not limited.

2. The controller for the hybrid vehicle according to claim 1, wherein:
   the hybrid vehicle includes an automatic transmission in a power transmission path between the engine with a supercharger and the rotary machine, on the one hand, and driving wheels, on the other hand; and
   the circuitry configured to curb a decrease in an amount of electric power stored in the power storage device more when it is determined that the operation of the supercharger is limited than when it is determined that the operation of the supercharger is not limited is further configured to shift a gear shifting line of the automatic transmission to a higher-speed side when it is determined that the operation of the supercharger is limited than when it is determined that the operation of the supercharger is not limited.

3. The controller for the hybrid vehicle according to claim 2, wherein:
   the circuitry configured to determine whether an operation of the supercharger is limited is further configured to determine continuity of a state in which the operation of the supercharger is limited; and
   the circuitry configured to curb a decrease in an amount of electric power stored in the power storage device more when it is determined that the operation of the supercharger is limited than when it is determined that the operation of the supercharger is not limited is further configured to set an amount of shift of the gear shifting line of the automatic transmission to the higher-speed side to be greater when it is determined that the state in which the operation of the supercharger is limited is long than when it is determined that the state in which the operation of the supercharger is limited is short.

4. The controller for the hybrid vehicle according to claim 1, wherein the circuitry configured to curb a decrease in an amount of electric power stored in the power storage device more when it is determined that the operation of the supercharger is limited than when it is determined that the operation of the supercharger is not limited is further configured to increase a regenerative torque at a time of regeneration of the rotary machine when it is determined that the operation of the supercharger is limited than when it is determined that the operation of the supercharger is not limited.

5. The controller for the hybrid vehicle according to claim 4, wherein:
   the circuitry configured to determine whether an operation of the supercharger is limited is further configured to determine continuity of a state in which the operation of the supercharger is limited; and
   the circuitry configured to curb a decrease in an amount of electric power stored in the power storage device more when it is determined that the operation of the supercharger is limited than when it is determined that the operation of the supercharger is not limited is further configured to set an amount of increase of the regenerative torque at the time of regeneration of the rotary machine to be greater when it is determined that the state in which the operation of the supercharger is limited is long than when it is determined that the state in which the operation of the supercharger is limited is short.

6. The controller for the hybrid vehicle according to claim 1, wherein the circuitry configured to curb a decrease in an amount of electric power stored in the power storage device more when it is determined that the operation of the supercharger is limited than when it is determined that the operation of the supercharger is not limited is further configured to limit travel with only the rotary machine as the drive power source for travel when it is determined that the operation of the supercharger is limited than when it is determined that the operation of the supercharger is not limited.

7. The controller for the hybrid vehicle according to claim 6, wherein:
  the circuitry configured to determine whether an operation of the supercharger is limited is further configured to determine continuity of a state in which the operation of the supercharger is limited; and
  the circuitry configured to curb a decrease in an amount of electric power stored in the power storage device more when it is determined that the operation of the supercharger is limited than when it is determined that the operation of the supercharger is not limited is further configured to set an amount of limitation of travel with only the rotary machine as the drive power source for travel to be greater when it is determined that the state in which the operation of the supercharger is limited is long than when it is determined that the state in which the operation of the supercharger is limited is short.

8. A control method for a hybrid vehicle, the hybrid vehicle including an engine with a supercharger serving as a drive power source for travel, a rotary machine serving as a drive power source for travel, and a power storage device configured to transmit and receive electric power to and from the rotary machine, the control method comprising:
  determining whether an operation of the supercharger is limited;
  compensating for a torque shortage of the engine due to limitation of the operation of the supercharger by a torque of the rotary machine when it is determined that the operation of the supercharger is limited; and
  curbing a decrease in an amount of electric power stored in the power storage device more when it is determined that the operation of the supercharger is limited than when it is determined that the operation of the supercharger is not limited.

* * * * *